United States Patent [19]
Ito et al.

[11] Patent Number: 5,729,217
[45] Date of Patent: Mar. 17, 1998

[54] VEHICLE ROUTE GUIDANCE APPARATUS FOR RESEACHING FOR A ROUTE WHEN VEHICLE GOES OUT OF ROUTE

[75] Inventors: Toru Ito, Nagoya; Akimasa Nanba, Chiryu; Kiyohide Katoh, Chiryu; Shinichi Katoh, Anjo; Koji Hashimoto, Kariya, all of Japan

[73] Assignee: Aisin AW Co., Ltd., Anjo, Japan

[21] Appl. No.: 688,728

[22] Filed: Jul. 31, 1996

Related U.S. Application Data

[63] Continuation of Ser. No. 95,449, Jul. 23, 1993, Pat. No. 5,559,511.

[30] Foreign Application Priority Data

| Jul. 23, 1992 | [JP] | Japan | 4-195777 |
| Aug. 19, 1992 | [JP] | Japan | 4-219886 |
| Aug. 19, 1992 | [JP] | Japan | 4-219887 |
| Aug. 19, 1992 | [JP] | Japan | 4-219913 |
| Aug. 19, 1992 | [JP] | Japan | 4-220062 |
| Aug. 19, 1992 | [JP] | Japan | 4-220063 |
| Aug. 19, 1992 | [JP] | Japan | 4-220092 |

[51] Int. Cl.[6] .................................. G08G 1/123
[52] U.S. Cl. .................. 340/988; 340/990; 340/995; 364/443; 364/449.9; 364/454
[58] Field of Search ...................... 340/988, 990, 340/995; 364/449, 443, 444, 457, 454, 449.9, 449.8, 449.1

[56] References Cited

U.S. PATENT DOCUMENTS

| 4,679,147 | 7/1987 | Tsujii | 340/995 |
| 4,734,863 | 3/1988 | Honey et al. | 364/449 |
| 5,043,902 | 8/1991 | Yokoyama | 340/995 |
| 5,060,162 | 10/1991 | Ueyama et al. | 364/449 |
| 5,179,519 | 1/1993 | Adachi et al. | 364/449 |
| 5,243,528 | 9/1993 | LeFebure | 340/995 |
| 5,317,515 | 5/1994 | Matswzaki | 364/454 |
| 5,485,385 | 1/1996 | Mitsugi | 364/449 |

FOREIGN PATENT DOCUMENTS

| 1173815 | 7/1989 | Japan . |
| 1173817 | 7/1989 | Japan . |
| 1173819 | 7/1989 | Japan . |
| 2 4285 | 1/1990 | Japan . |
| 2103584 | 4/1990 | Japan . |
| 3137679 | 6/1991 | Japan . |
| 3269317 | 11/1991 | Japan . |
| 9204683 | 3/1992 | Japan . |

*Primary Examiner*—Jeffery Hofsass
*Assistant Examiner*—Benjamin C. Lee
*Attorney, Agent, or Firm*—Cushman, Darby & Cushman IP Group of Pillsbury, Madison & Sutro LLP

[57] ABSTRACT

A route guidance section compares the current position provided by a current position determination section and the route provided by a route calculation section for detecting an off-route condition. When the off-route condition is detected, a re-searching key as well as the route and current place is displayed on a display section. When the re-searching key is touched, a search is again made for a new route from the current position to the destination. Then, route guidance is again started in response to the re-searching result. When the re-searching key is not touched, the route and current place continue to be displayed while the vehicle carrying the apparatus travles off route, thereby efficiently preventing the apparatus from executing unnecessary re-searching when the driver drives the vehicle off route on purpose.

14 Claims, 26 Drawing Sheets

| NATIONAL HIGHWAY | $x_1, y_1$ |
| | $x_2, y_2$ |
| | $\vdots \quad \vdots$ |
| | $x_n, y_n$ |
| PREFECTURAL HIGHWAY | $x_1, y_1$ |
| | $\vdots \quad \vdots$ |

| DRAWN ELEMENT | COLOR CODE |
|---|---|
| EXPRESSWAY | 3 |
| CITY EXPRESSWAY | 3 |
| NATIONAL HIGHWAY | 2 |
| . | . |
| . | . |
| BACKGROUND | 9 |

| COLOR CODE | PALLET 9 R G B | PALLET 1 R G B |
|---|---|---|
| 0 | 7 8 0 | 7 8 0 |
| 1 | 0 8 f | 0 8 f |
| 2 | f 7 9 | f 8 a |
| ⋮ | ⋮ | ⋮ |
| 9 | e f f | e f f |
| ⋮ | ⋮ | ⋮ |
| 15 | 9 8 6 | 9 8 6 |

VEHICLE ROUTE GUIDANCE APPARATUS FOR RESEACHING FOR A ROUTE WHEN VEHICLE GOES OUT OF ROUTE

This is a continuation of application Ser. No. 08/095,449, filed Jul. 23, 1993, now U.S. Pat. No. 5,559,511.

BACKGROUND OF THE INVENTION

1. Field of the Invention

This invention relates to a vehicle route guidance apparatus for guiding the user through a route using a generated voice, and, more particularly, to an apparatus that re-searches for a route when the vehicle carrying the apparatus goes off the route.

2. Description of the Related Art

Various types of apparatus to relieve drivers of their work load have been designed and are carried by vehicles. One of them is a route guidance apparatus for guiding the user through a route to a destination. A route guidance apparatus, which has a function of informing the driver of routing when the vehicle passes a branch point such as a crossing, for guiding the driver through the route with a generated voice is known. Such an apparatus it is disclosed, for example, in Japanese Patent Laid-Open No.Hei 1-173815.

When a destination is entered, the route guidance apparatus can search for a route from the current place to the destination and then display the found route for the driver. It also has a function of detecting the current position of the vehicle. When the vehicle moves, the route guidance apparatus displays both the route and the current position for guiding the driver through the route.

Although the driver is guided through the route, the vehicle may stray off the predetermined route. In such a case, the driver might want to know a new route from the current place to the destination. Proposed in Japanese Patent Laid-Open No.Hei 1-173815 is an apparatus which, when the vehicle goes off the preset route, alerts the driver and re-searches for a new route to the destination.

The route guidance apparatus enables the driver to obtain preferred guidance through a new route from the current place to the destination even if the vehicle goes off the route.

However, when the driver is on the way to the destination, he or she may place the vehicle off the route on purpose, perhaps in order to do some shopping at a store along the road or to pick up a person on the assumption that the driver will return the vehicle to the predetermined route. Even in such a case, the conventional apparatus automatically re-searches for a route. Further, if the driver returns the vehicle to the original route by taking a different route from the re-searching result, the apparatus repeats re-searching. While re-searching is being executed, guidance stops. Unnecessary re-searching is performed and the operation of the apparatus does not meet the user's needs.

SUMMARY OF THE INVENTION

Accordingly, it is an object of the invention to provide a vehicle route guidance apparatus which can efficiently re-search for a new route when the vehicle carrying the apparatus goes off the old route to a destination.

To this end, according to one embodiment of the invention, there is provided a vehicle route guidance apparatus which searches for a route to a destination and executes route guidance at a branch point or the like, comprising:

means for detecting the current position of the vehicle carrying the apparatus;

means for comparing the current position and the found route;

means being responsive to the comparison result provided by the comparison means for detecting an off-route condition;

upon detection of the off-route condition, means for informing the user of occurrence of the condition;

means for again searching for a new route from the current position to the destination;

a switch for the user to instruct the apparatus to execute re-searching; and when the off-route condition is detected by the off-route condition detection means and the re-searching switch is operated by the user, means for controlling the apparatus so that the re-searching means re-searches for a new route.

Thus, only when the vehicle goes off the route and the user operates the re-searching switch, will the route guidance apparatus re-search for a new route. This can efficiently prevent the apparatus from executing unnecessary researching when the driver deliberately drives the vehicle off the route.

Preferably, the route guidance apparatus further includes means for displaying the route and the current position on a map to enable the user to easily recognize the route.

Preferably, the display means displays the selected route in a different color from that of other roads.

Preferably, the re-searching switch is a touch switch displayed on the display means.

The re-searching switch is provided as a touch switch, thereby eliminating the need for installing a special switch and saving space. The switch can also be made comparatively large for easy operation.

Preferably, the re-searching switch is displayed when an off-route condition is detected by the off-route condition detection means. By displaying the re-searching switch and the current position when the off-route condition is detected, the driver can be informed that the vehicle has gone off the route.

DESCRIPTION OF THE PREFERRED EMBODIMENTS

Referring now to the accompanying drawings, there are shown preferred embodiments of the invention.

Figure 1:
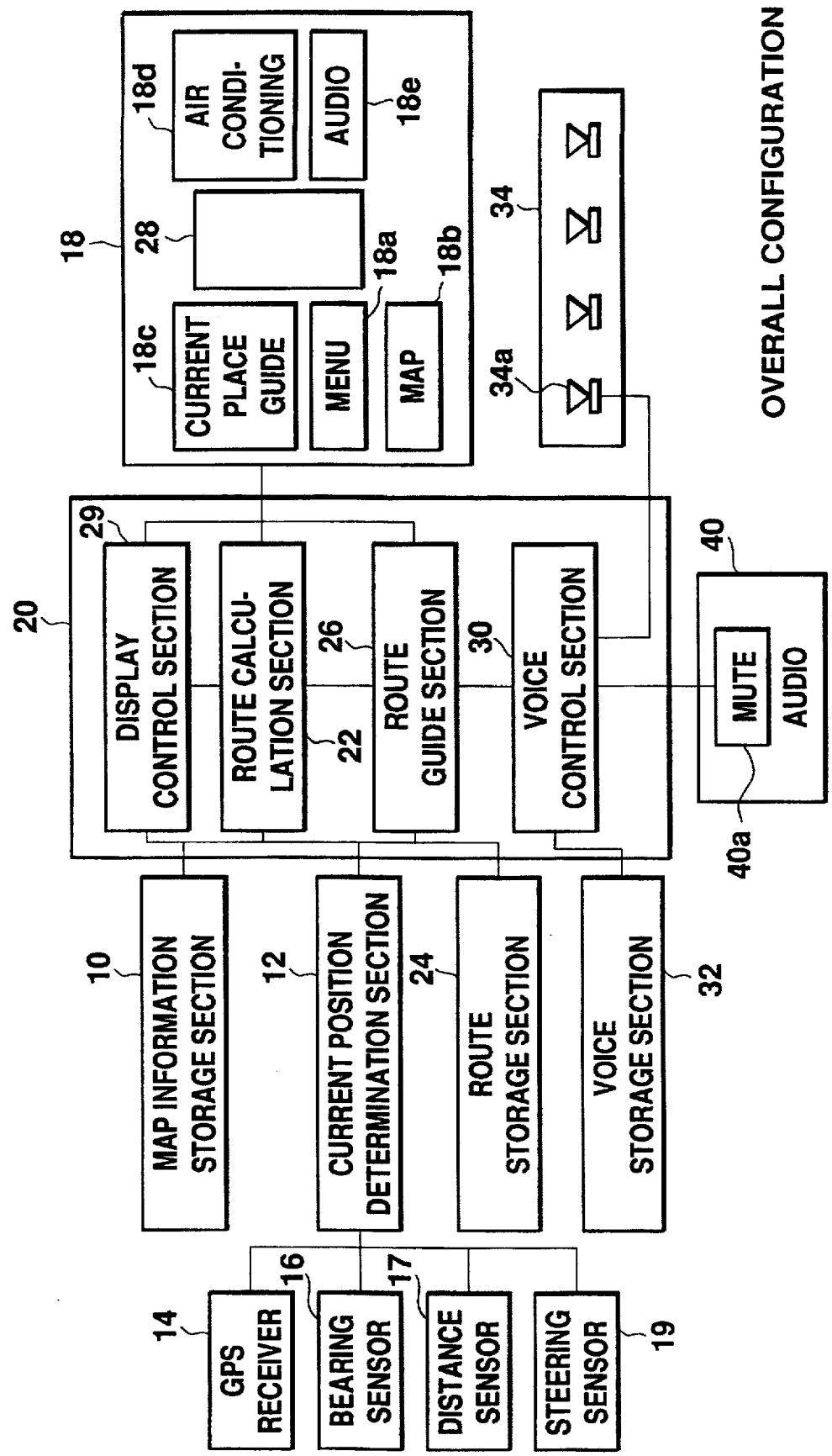
FIG. 1 is a block diagram showing the overall configuration of a route guidance apparatus according to the invention.

First embodiment:

FIG. 1 shows a block diagram showing the configuration of a route guidance apparatus according to the invention. Numeral 10 is a map information storage section which stores information such as roads, place names (crossing names), building names, and river names; the stored map information can be read as required. Numeral 14 is a GPS receiver using the Global Positioning System (GPS), which is a satellite navigation system for determining the current position of the vehicle carrying the apparatus. Numeral 16 is a bearing sensor 16 which detects the movement direction of the vehicle in response to terrestrial magnetism. Numeral 17 is a distance sensor which detects the traveling distance in response to the number of wheel revolutions. Numeral 12 is a current position determination section which determines the current position of the vehicle in response to the detection results of the sensors 16 and 17. Information from a steering sensor 19 is also entered, and is used for map matching for correcting the current place to the crossing position on the map when the driver turns the vehicle to the right or left at a crossing.

For the route guidance apparatus to guide the driver through a route to a destination, the user should specify the destination on a display section screen (described below) through an input section 18 or enter information such as a place name. A route to the destination from the current position calculated by the current position determination section 12 is calculated by a route calculation section 22 contained in an operation control section 20, and the calculated route is stored in a route storage section 24. An appropriate route search method is adopted for calculating the route.

After the destination is entered and the route is determined, actual route guidance is executed. A route guidance section 26 contained in the operation control section 20 reads map information around the vehicle from the map information storage section 10, and displays it together with the current vehicle position and movement direction and the route stored in the route storage section 24 on the display section 28.

Display on the display section 28 is controlled by a display control section 29 in the operation control section 20. The display control section 29 has a read-only memory (ROM) which stores patterns of characters, symbols, etc., and an image memory which stores display data for one screen; it uses the memories for controlling the display.

Figure 2:
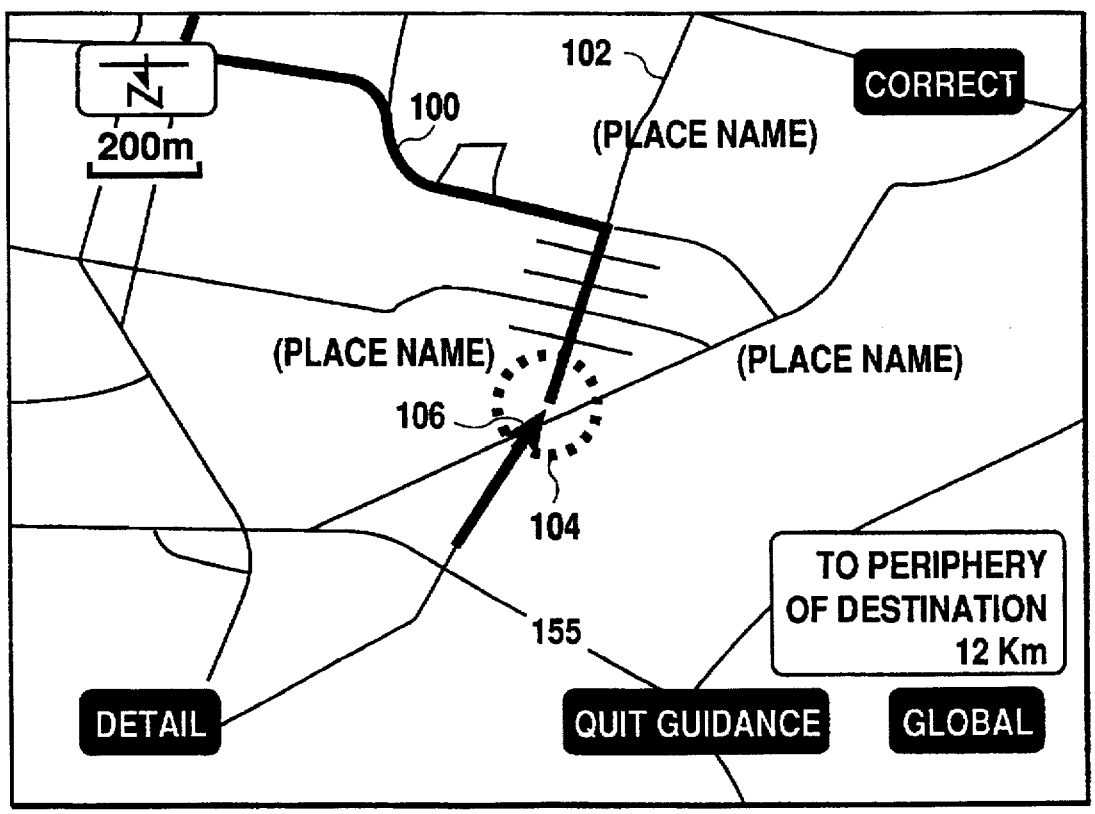
FIG. 2 is an illustration showing a display example of route guidance.

The display section 28 is located in an instrument panel near the driver's seat. Seeing the display section 28, the driver checks the position of the vehicle and gets information on the forward route. FIG. 2 shows an example of display on the display section 28. In FIG. 2, the selected route is indicated by a thick solid line 100 and other roads are indicated by thin solid lines 102. The position of the vehicle is indicated by a circle 104 and the movement direction is indicated by a wedge-shaped arrow 106. Displayed roads can be distinguished from each other in colors as well as by line thickness.

Figure 3:
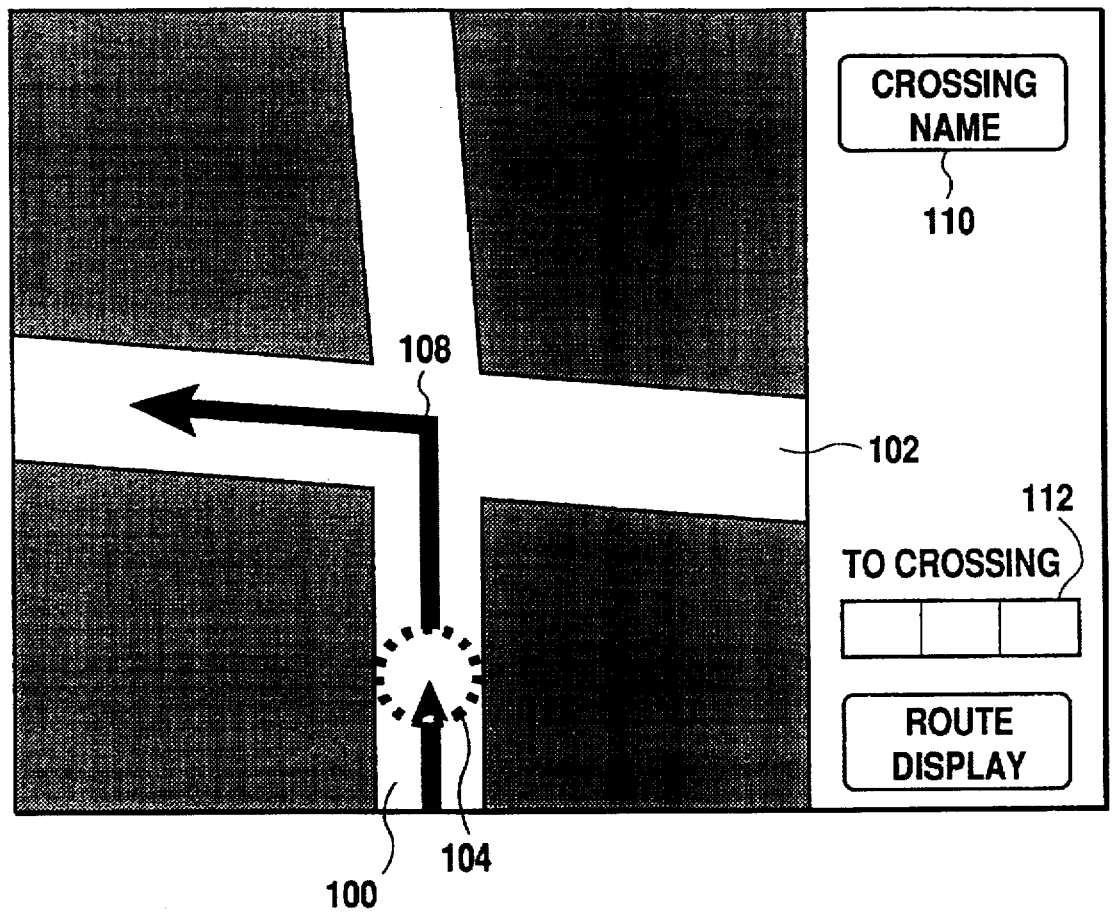
FIG. 3 is an illustration showing a display example of route guidance around a crossing.

When the position of the vehicle approaches a crossing 108 where the course is to be changed, the display screen changes to that as shown in FIG. 3, and crossing name 110 and distance 112 to the crossing are displayed. At the same time as the display change, the route guidance section 26 instructs a voice control section 30 to generate a voice corresponding to route guidance at the crossing. The voice control section 30 reads information stored in a voice storage section 32 as digital data and converts it into analog signals for driving a loudspeaker section 34. The voice control section 32 tells the driver a message such as "at the * * * crossing, about 300 m ahead, turn to the left" through the loudspeaker section 34 for route guidance. The voice instruction is given every predetermined distance until the vehicle passes through the crossing. For example, when the vehicle proceeds along on a road of two or more lanes, the first guidance is given 700 m short of the crossing, the second 300 m short of the crossing, and the final guidance 100 m short of the crossing. The guidance voice is stored in a voice storage section 32 as digital data for each phrase. To output a guidance voice, a number of digital data pieces are read for phrase synthesis. Then, the guidance voice is output from the loudspeaker section 34 as guidance signals. The guidance voice output timing is detected by the route guidance section 26 and processing for the voice output is performed by the voice control section 30.

Only the right front loudspeaker 34a in the loudspeaker section 34 is used for both output from an audio section 40 and guidance voice output. When a guidance voice is output, the loudspeaker 34a is disconnected from the audio section 40. To prevent noise from occurring at the time of disconnection, a mute circuit 40a is provided to mute an output of the audio 40 at this time.

In the embodiment, the display section 28 uses a touch panel as its screen which also functions as the input section. The touch panel enables the driver to enter data simply by touching entries such as a place name displayed on the display section 28. The input section 18 is provided with a menu key 18a to return to a menu screen for selecting processing such as destination input or volume control, a map key 18b for displaying a map, a current place guidance key 18c to return to a current place display screen or request guidance in the current state, an air conditioning key 18d for displaying an air conditioner control screen, and an audio key 18e for displaying an audio control screen.

If the driver selects an erroneous route while driving running the vehicle, the current position goes off the predetermined route. Then, the route guidance section 26 recognizes the off-route condition from the comparison of the current position and route. On the other hand, a screen as shown in FIG. 2 is displayed on the display section 28, and if the current position goes off route, it is displayed at a point away from the route, as shown in FIG. 4.

Figure 4:
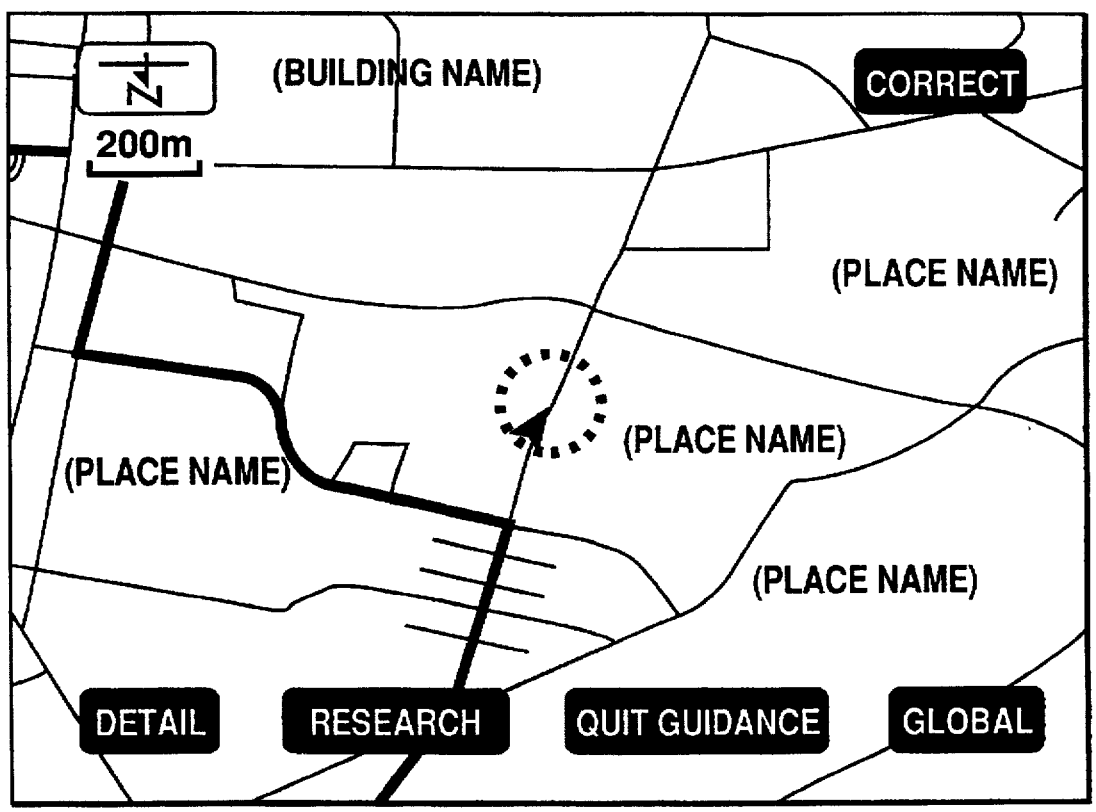
FIG. 4 is an illustration showing a display example when an off-route condition is detected.

At such a time, the route guidance section 26 displays RE-SEARCH on the bottom of the screen as shown in FIG. 4. If the driver touches RE-SEARCH on the panel, the route guidance apparatus again searches for a new route from the current place to the destination from the beginning, as described above. Upon completion of the re-searching, the route guidance apparatus again starts route guidance in response to the re-searching result.

In the embodiment, when an off-route condition is detected, the route guidance apparatus only informs the driver that the off-route condition has occurred by displaying the route and the current position and RE-SEARCH on the screen without immediately executing re-searching. The route guidance apparatus does not re-search for a new route until the driver touches the RE-SEARCH key. This can efficiently prevent the apparatus from executing unnecessary re-searching when the driver drives the vehicle off route on purpose. Particularly, when re-searching is not executed, the route and the current place are displayed.

Second embodiment:

In the first embodiment, the DETAIL and GLOBAL keys are displayed on the map display screen (current place display screen) as shown in FIG. 2. When the driver touches the DETAIL or GLOBAL key on the current place display screen, processing for changing the scale is performed.

Figure 5:
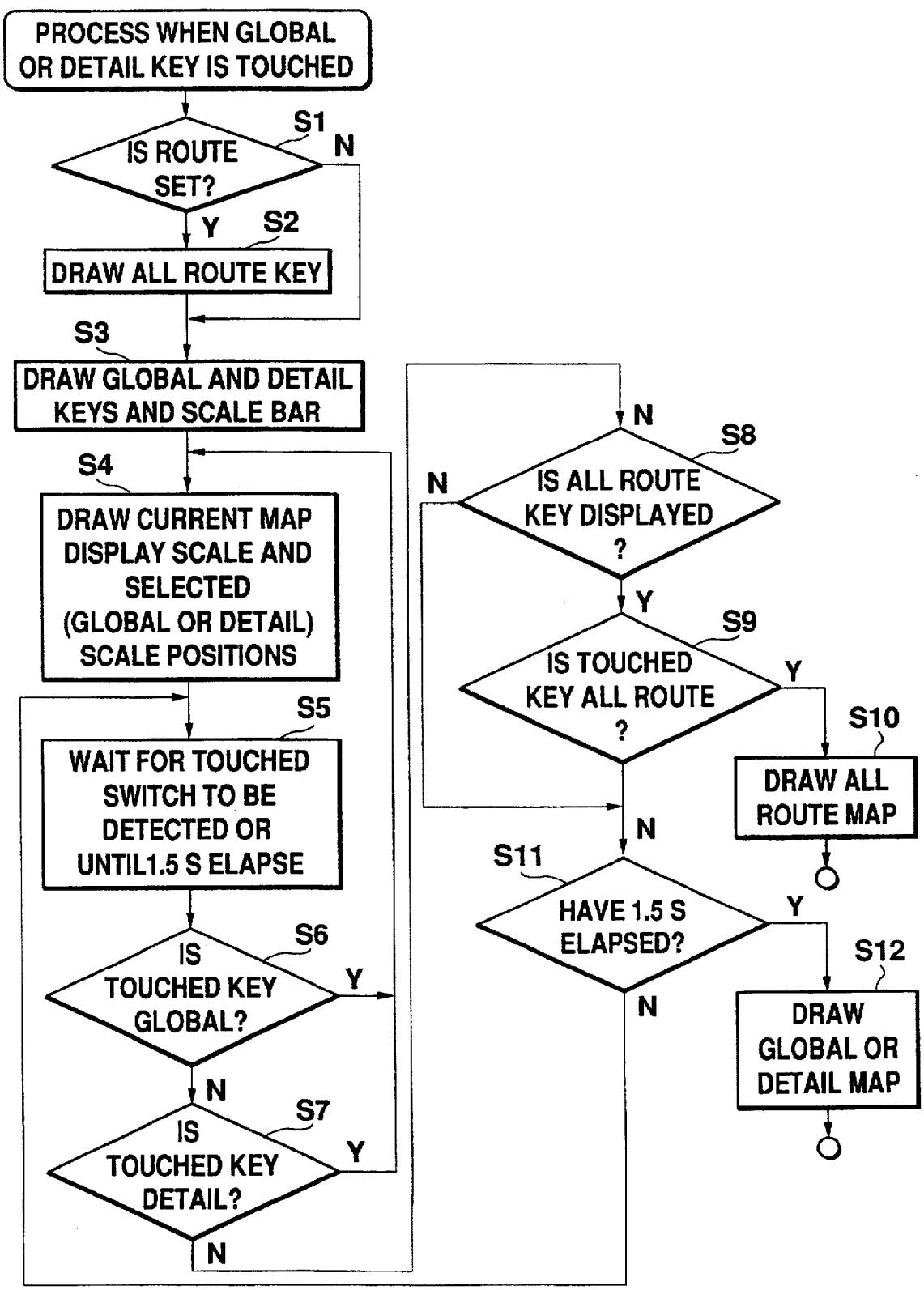
FIG. 5 is a flowchart showing an operation when a scale is changed.
Figure 6:
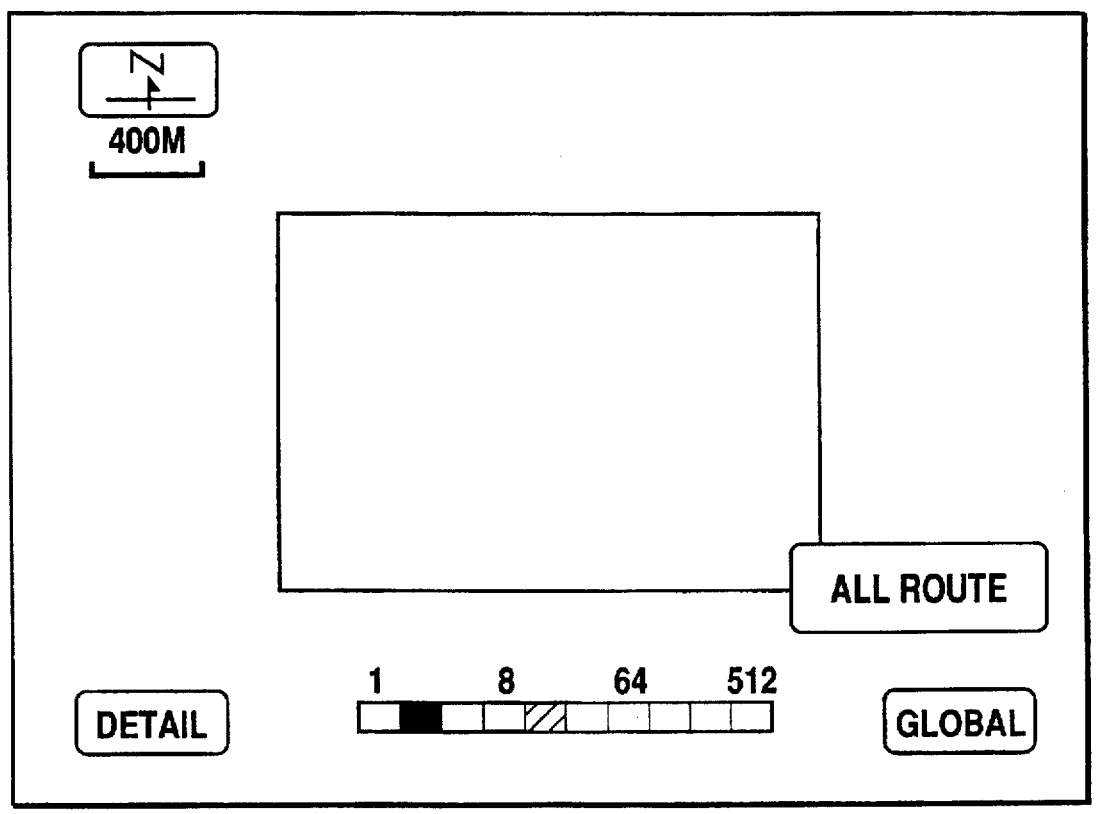
FIG. 6 is an illustration showing display screens when a scale is changed.

The scale change processing is described in conjunction with FIG. 5. First, when the DETAIL or GLOBAL key is touched, whether or not a route is set is determined at step S1. That is, a determination is made as to whether or not the driver sets a destination and route to drive the vehicle. If the route is set, an ALL ROUTE key is drawn at step S2 and GLOBAL and DETAIL keys and a scale bar are also drawn at step S3 for displaying ALL ROUTE, GLOBAL, and DETAIL keys and the scale bar on the map screen as shown in FIG. 6. The scale bar denotes a scale; the current scale is indicated in blue (hatched in FIG. 6) and the next scale to be selected is indicated in green (in black in FIG. 6). Then, the current map scale and selected scale positions are drawn on the scale bar at step S4.

At step S5, a wait is made for a touched switch to be detected or until 1.5 seconds elapse. Which of the GLOBAL, DETAIL, and ALL ROUTE keys is touched is determined at steps S6–S9. If the touched key is ALL ROUTE, an all route map is drawn at step S10. If the touched key is GLOBAL or DETAIL, whether or not 1.5 seconds have elapsed after the key was touched is determined at step 11. If 1.5 seconds have elapsed, the scale is defined and a map on the selected scale is drawn at step S12.

The GLOBAL and DETAIL keys are displayed on the scale change screen and when either key is touched, the scale is changed. Ten types of scale are available: 1 to 10000, 1 to 20000, 1 to 40000, 1 to 80000, 1 to 100000, 1 to 160000, 1 to 320000, 1 to 640000, 1 to 1280000, 1 to 2560000, and 1 to 5120000. A map screen on one of the scales can be selected by touching the DETAIL or GLOBAL key. Since a wait is made for 1.5 seconds at step S11, the scale is changed in sequence by continuing to press the key, and when a proper scale is selected, touching the key is stopped for defining the selected scale. In the example, the scale is defined by performing no operation for 1.5 seconds.

Figure 7:
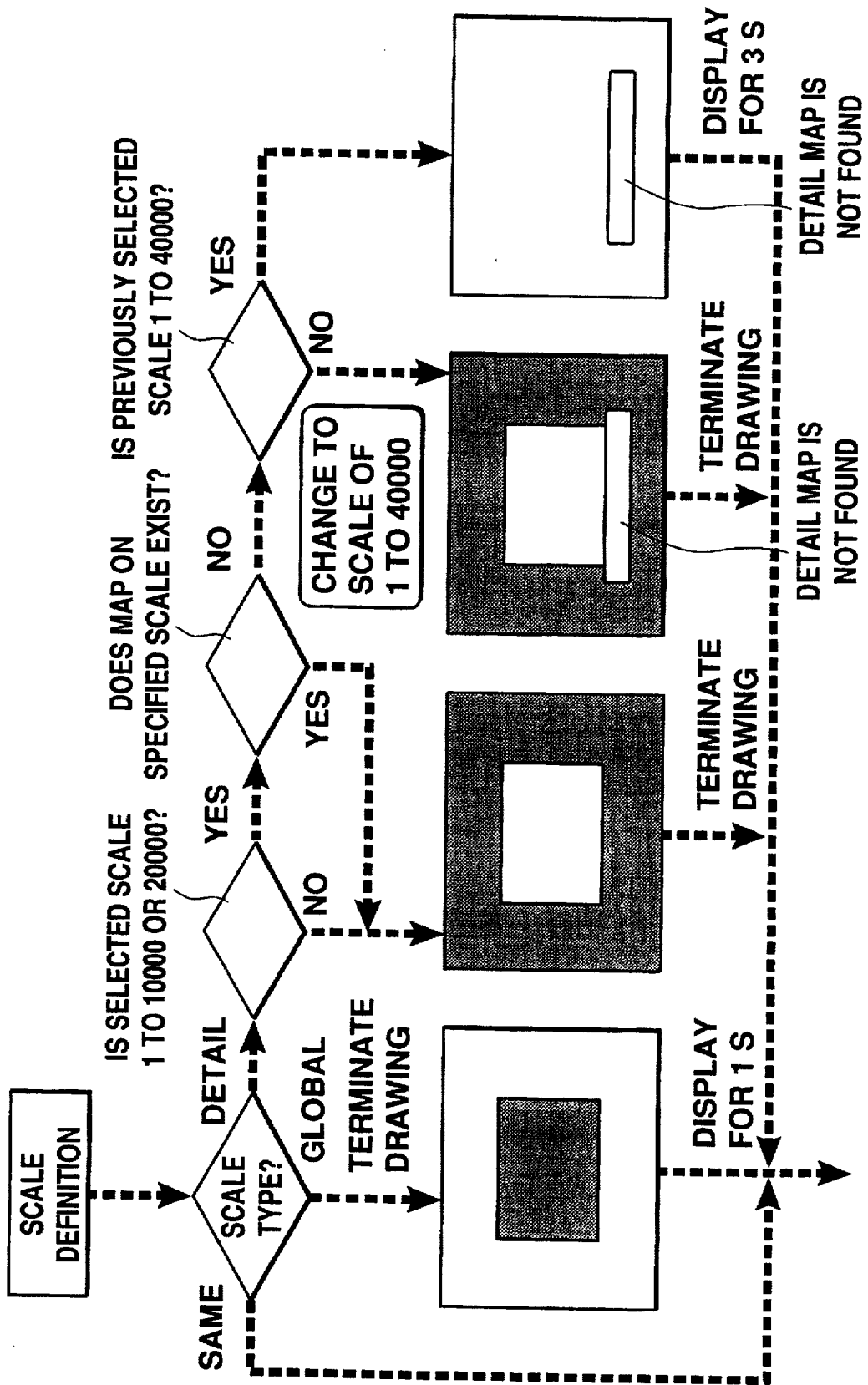
FIG. 7 is an illustration showing an operation when a scale is changed.

When the scale is defined, the map on the selected scale is drawn at step S12, as shown in FIG. 7. First, the scale is determined. If it is 1 to 40000 or more, the map on the specified scale is drawn on the screen directly. If the scale is 1 to 10000 or 20000, the corresponding map may not exist, thus whether or not the map on the specified scale exists is determined. If the map on the specified scale exists, it is drawn on the screen directly. On the other hand, if it does not exist, a message of "DETAIL MAP IS NOT FOUND" is displayed, then a map on a scale of 1 to 40000 is drawn on the screen. On the other hand, if the previous scale for the map displayed before the present selection operation is 1 to 40000, the scale remains unchanged, thus the message "DETAIL MAP IS NOT FOUND" is displayed, then the screen returns to the former map on the scale of 1 to 40000.

Figure 8:
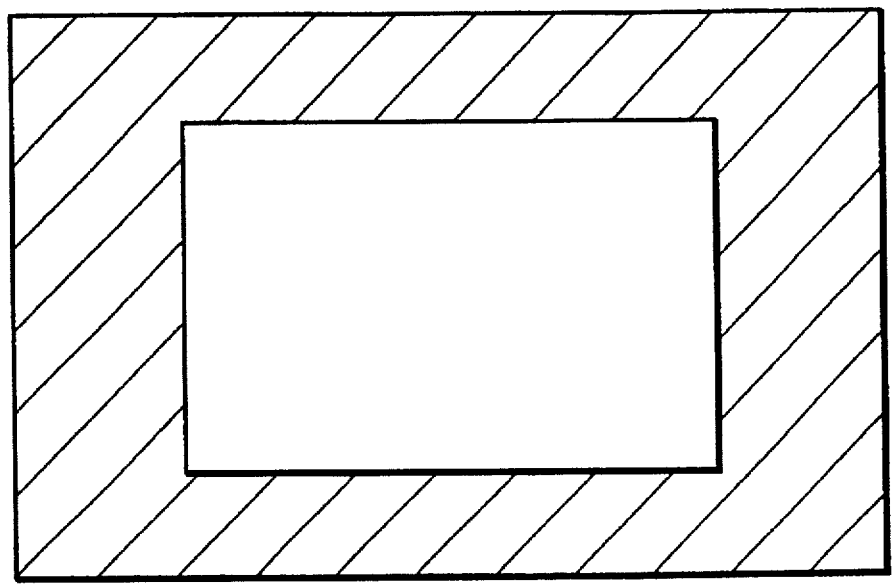
FIG. 8 is an illustration showing frame display when a detail map is displayed.
Figure 9:
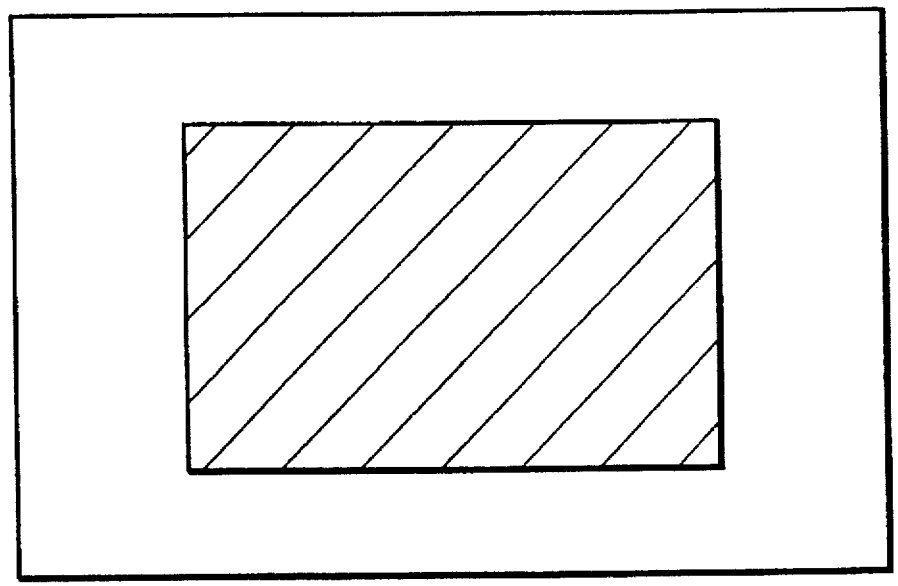
FIG. 9 is an illustration showing frame display when a global map is displayed.

In the second embodiment, when a scale is selected, a frame indicating the scale as well as the scale bar is displayed. When a map on a scale of 1 to 160000 is displayed, if the driver touches the DETAIL key and selects a scale of 1 to 100000, any portion other than the portion to be displayed on the scale of 1 to 100000 is hatched as shown in FIG. 8. On the other hand, when a map on a scale of 1 to 100000 is displayed, if the driver selects a scale of 1 to 160000, the display portion on the current scale of 1 to 10000 in a map on a scale of 1 to 160000 is hatched as shown in. FIG. 9. Thus, the frame size is determined in response to a new scale and the relationship between the current scale and new scale is displayed.

Therefore, with reference to the frame display, the user can know which part of the map will be displayed after scale selection, and the user can select any scale efficiently. For example, a map where both the current place and destination are entered can be selected easily.

Figure 10:
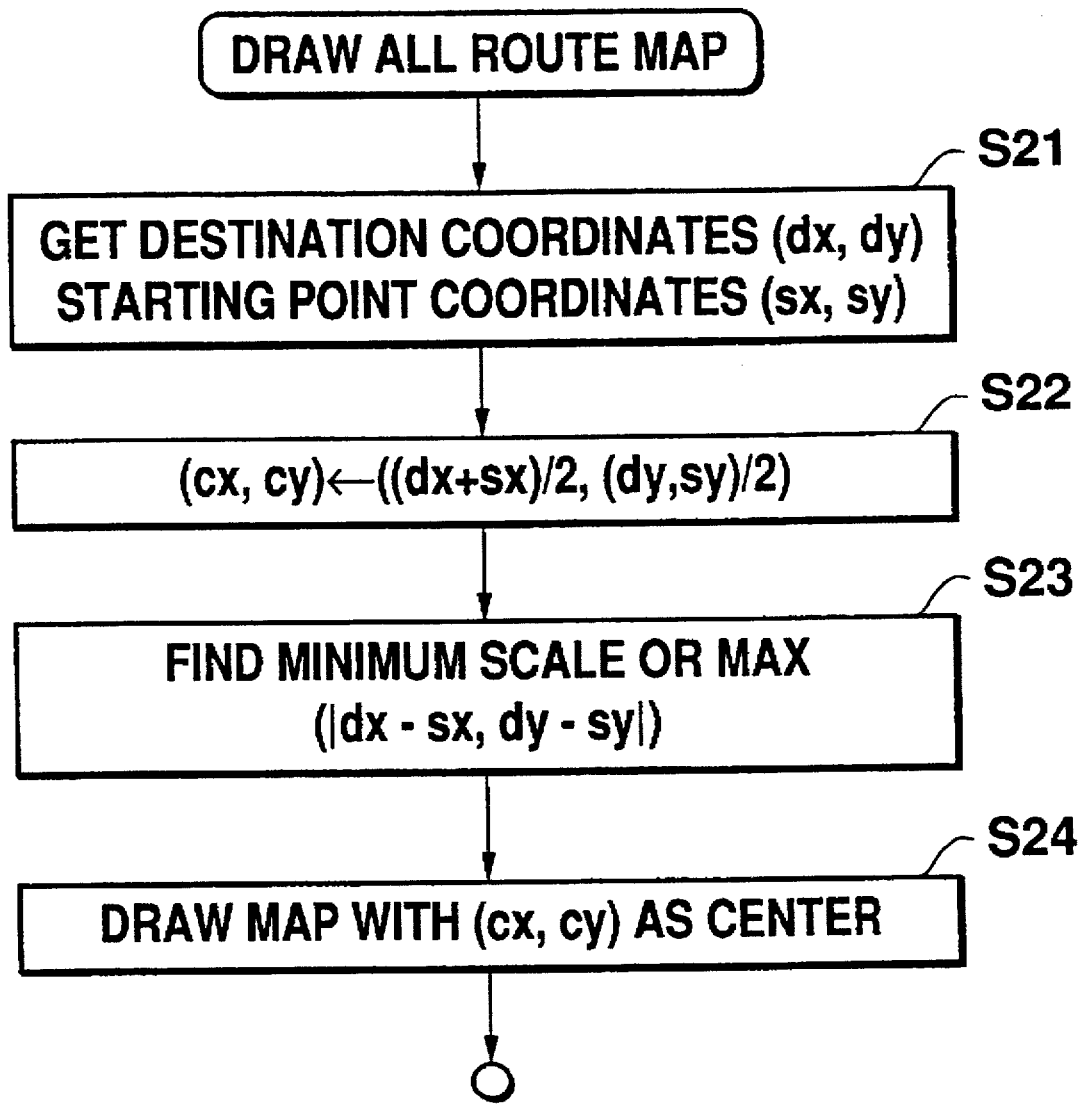
FIG. 10 is a flowchart showing an operation of drawing all route maps.

Next, drawing an all route map at step S10 is described in conjunction with FIG. 10. First, destination coordinates (dx, dy) and starting point coordinates (sx, sy) are obtained at step S21. Next, at step S22, from the destination coordinates (dx, dy) and starting point coordinates (sx, sy), the coordinates of a midway point (cx, cy) are found by the following expression:

$$(cx, cy) = ((dx+sx)/2, (dy+sy)/2)$$

Next, the minimum scale on which both the destination and starting point are entered is found at step 23. That is, max (dx−sx , dy−sy ) is found. A map on the scale determined at step S23 is drawn with the coordinates (cx, cy) as the center at step S24. In such a sequence, the all route map containing both the starting point and destination is displayed on the screen.

In the second embodiment, the ALL ROUTE key is displayed on the scale change screen. This prevents the ALL ROUTE key from being displayed at the normal time and covering a part of the map display. When the user touches the ALL ROUTE key, an all route map is displayed, enabling the user to display all of the route without touching the GLOBAL and DETAIL keys repeatedly.

Further, in the embodiment, the center of map display can be changed by single finger motion. When a map is displayed with the normal current position as the center, if the user touches any desired point of the map, the map display center moves to the touched point. For example, if the user touches the left corner of the screen, a change is made to display the map with the left corner as the center. To smooth such a display change operation as single finger motion, the scale can be changed with any desired point as the map center from the current screen. Thus, map display at any desired position and on any desired scale can be accomplished. Large map information is read from the map information storage section 10 into the operation control section 20 and the storage contents may be used for display change. Operation for a movement of the current place can also be smoothed.

On the other hand, if the user touches the CURRENT PLACE GUIDANCE key on the input section 18 on the single finger motion screen described above, the map display on the screen can be restored to that with the current position as the center.

Further, in the embodiment, the CURRENT PLACE GUIDANCE key also serves as a voice guidance request key in addition to the function key described above. When a map with the current position as the center is displayed in the route guidance mode, if the user touches the CURRENT PLACE GUIDANCE key, route guidance is executed in a voice at that time. On the main menu, the user can enter "voice guidance off" for route guidance in the embodiment. In this case, voice guidance is turned off and route guidance is executed only on the screen. In this state, if the driver touches the CURRENT PLACE GUIDANCE key, voice guidance is executed in response to the current position (for instance, such voice guidance as "left at turn the * * * crossing about 700 m ahead").

When voice distance is requested, a map with the current position as the center is displayed, and to move to the screen with the current position as the center, the current map should be displayed with the point specified through single finger motion as the center, thus one key can be used for the two functions. Therefore, the number of keys on the input section 18 can be reduced.

As described above, according to the second embodiment, when the scale of a displayed map is changed, a figure is displayed on the screen showing the display range relationship between the current displayed map and a new map after the scale is changed. Therefore, seeing the display showing the relationship, the user can set any proper scale. After seeing the display showing the relationship, if the user can change the center position of a new map after changing the scale, setting the center position is also facilitated.

Third embodiment:

A route guidance apparatus according to a third embodiment of the invention uses a color display, such as a color liquid crystal display, as a display section 28. To make the map display more easily discernible, red is assigned to a national railway, brown to a prefectural highway, blue to a river, white to a background, black to characters, and so forth when using a color display.

Figure 11:
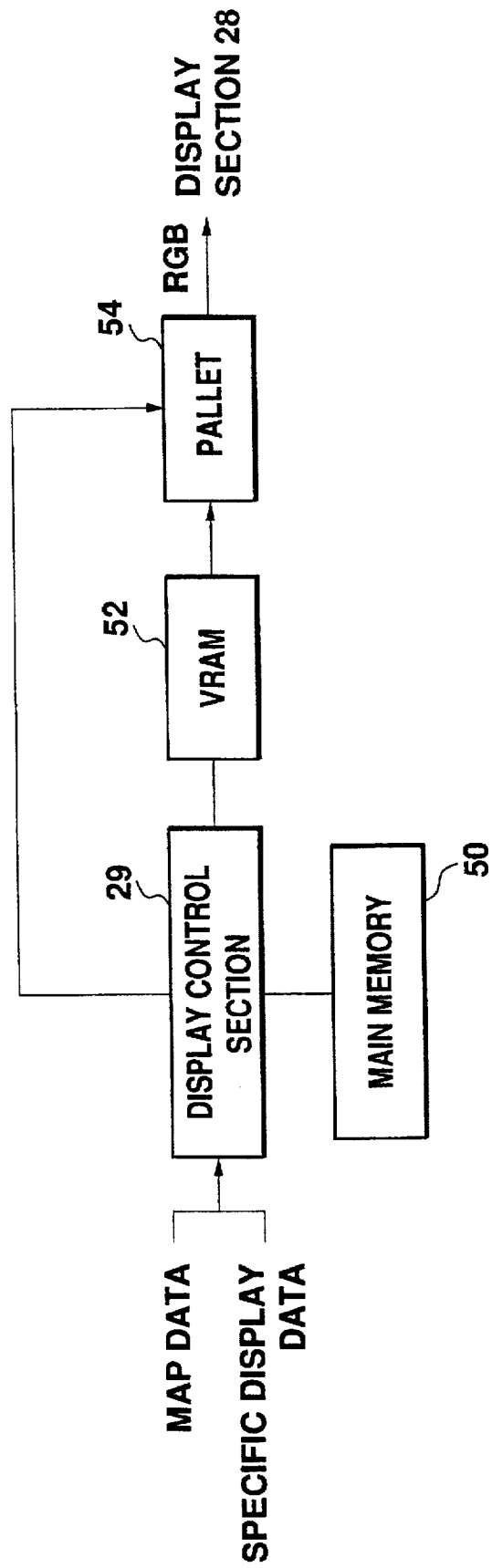
FIG. 11 is a block diagram showing the configuration for screen display.

FIG. 11 shows the configuration of an operation control section 20 for display control. As shown here, it has a display control section 29, a main memory 50, a VRAM 52, and a pallet section S4. The main memory 50 is used for the entire operation of the operation control section 20 and it is composed of DRAM.

Display data input to the display control section 29 includes map data stored in the map information storage section 10 and specific display data such as current place display data, search results representing route data to a destination, and touch key display data provided by the current position determination section 12 and route guidance section 26. The display control section 29 receives the display data and converts it into display data for each picture element.

Figures 12, 13:
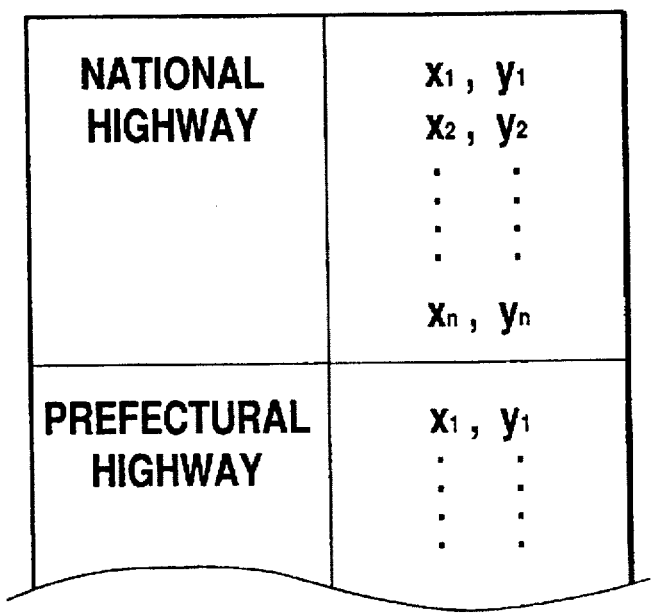
FIG. 12 is an illustration showing the map data contents.
FIG. 13 is an illustration showing the correspondence between drawn elements and color codes.

As the map data in the map information storage section 10, latitudes (x) and longitudes (y) of national and prefectural highways, etc., are stored as shown in FIG. 12. The data in a given range (given latitude and longitude ranges) is read from the map information storage section 10 into the main memory 50. On the other hand, the operation control section 20 previously store assignments of color codes to classified map display elements (drawn picture element color table), and assigns color codes conforming to display classification to picture elements according to the color code table shown in FIG. 13. In an example in FIG. 13, color code 3 is assigned to the expressway and city expressway, color code 2 to the national highway, and color code 9 to the background. Therefore, based on the display data stored in the map information storage section 10, display element classification, namely, drawn elements are recognized and color codes are assigned to picture elements according to the drawn elements.

The display data for each picture element from the display control section 29 is stored in the VRAM 52 which stores display data for one screen. To display a national highway as shown in (a) of FIG. 14, color codes of the background (9) and the national highway (2) are stored for each picture element, as shown in (b) of FIG. 14.

Next, the color codes for each picture element read from the VRAM 52 are converted into RGB data by the pallet section 54, and the RGB data is supplied to the display section 28 on which a map is displayed in colors corresponding to the color codes.

Figures 14, 15:
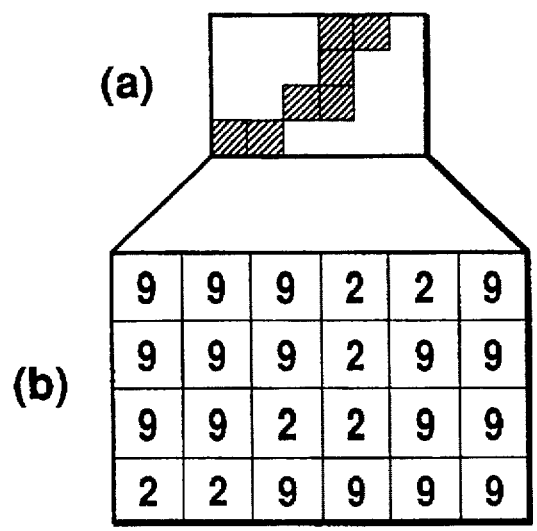
FIG. 14 is an illustration showing the data contents in VRAM.
FIG. 15 is an illustration showing the pallet contents.

The pallet section 54 has the configuration as shown in FIG. 15. In the pallet section 54, the color codes supplied for each picture element are converted into strength data for each of red, blue and green. The display section 28 receives the RGB signals and performs predetermined color display. In the embodiment, two conversion systems (pallets 1 and 2) are provided. With the pallet 1, RGB (f, 7, 9: Red) is assigned to the national highway; with the pallet 2, RGB (c, 8, a: Purple) is assigned to the national highway.

Figure 16:
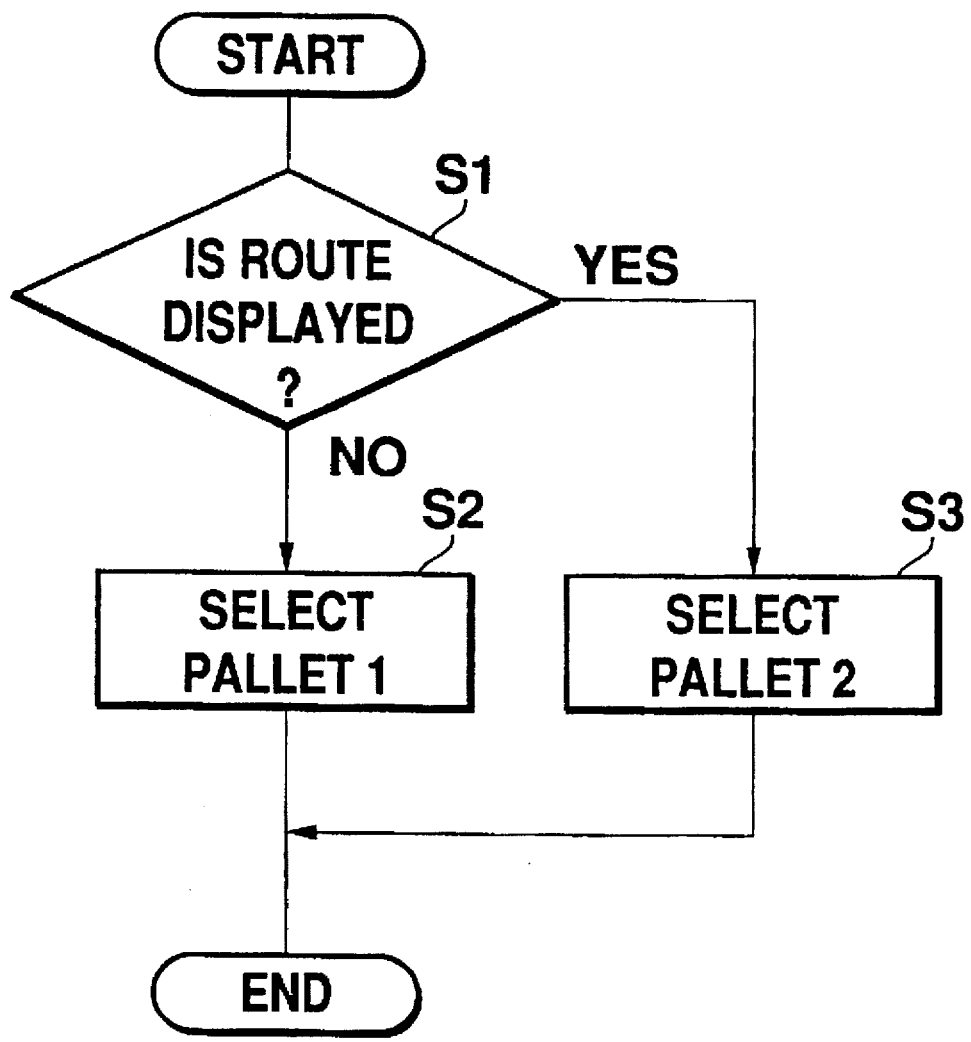
FIG. 16 is a flowchart showing pallet change operation.

In the embodiment, the display control section 29 controls changing of pallets 1 and 2 depending on whether or not route display is executed. As shown in FIG. 16, the display control section 29 determines whether or not route display is executed from the contents of specific display data at step S1. This determination is easily made by the operation control section 20 based on whether or not a destination is set and the route calculation section 22 finds a route. For no route display, the pallet 1 is selected at step S2; for route display, the pallet 2 is selected at step S3.

Figure 17:
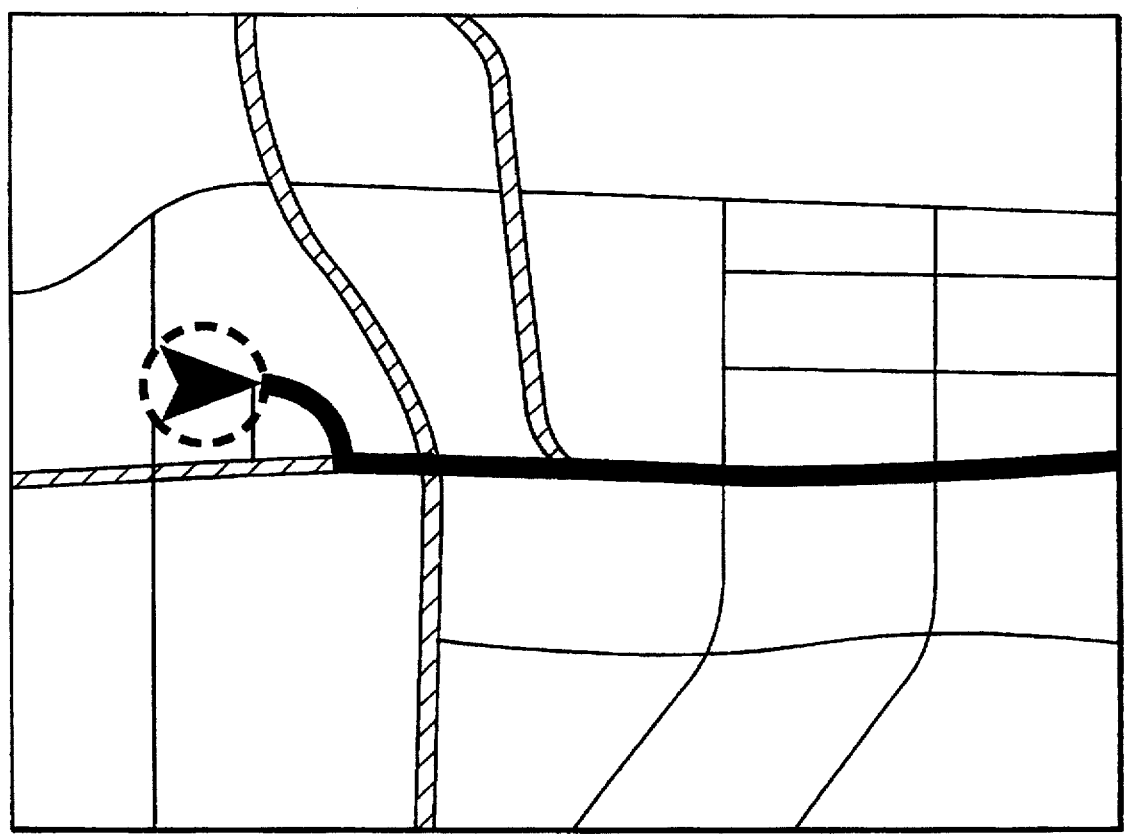
FIG. 17 is an illustration showing the display state when a route is displayed.
Figure 18:
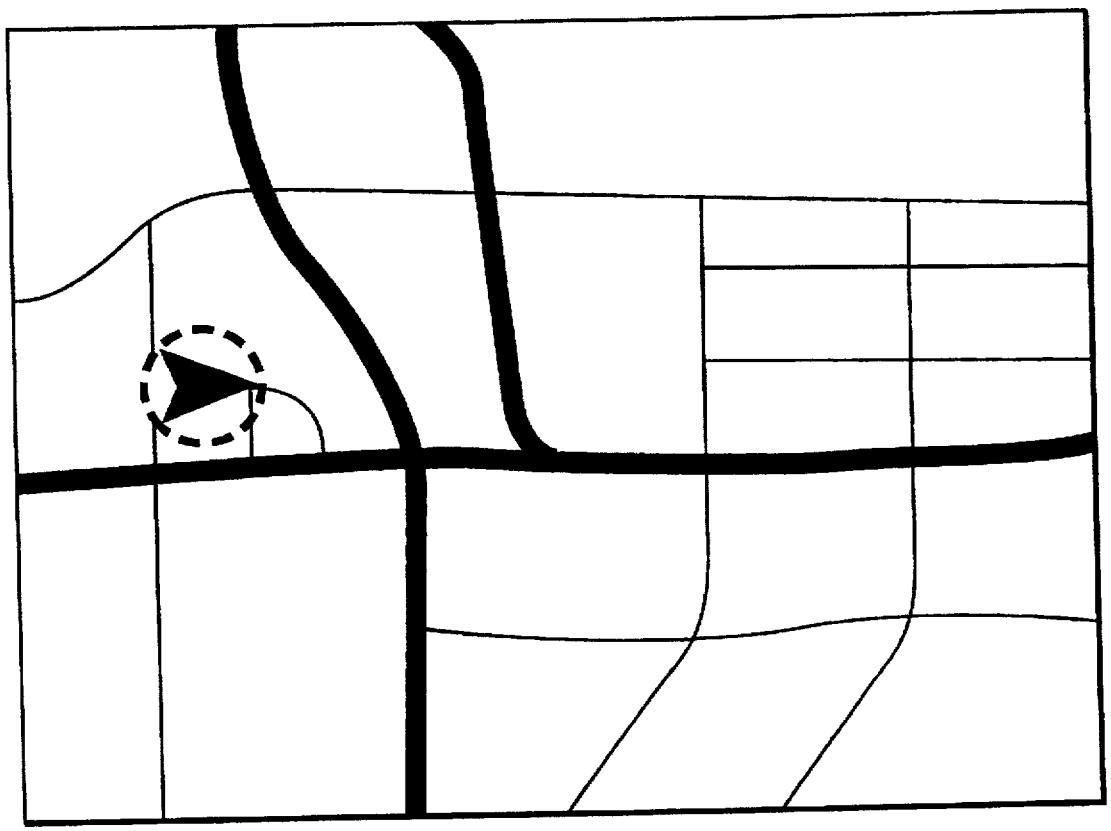
FIG. 18 is an illustration showing the display state when no route is displayed.

Thus, the display colors can be changed depending on whether or not a given route is displayed. In the example, for no route display, as shown in FIG. 18, the main roads are displayed in red (in black in FIG. 18) like a normal map display for discernible display. On the other hand, for route display, the route to be selected by the user should be highlighted most. Then, as shown in FIG. 17, the route is displayed in red and the main roads are displayed in purple (hatched in FIG. 17), thereby toning down the display of the main roads and clarifying the route.

To change other colors for route display, the following techniques can be used in addition to the example given above:

(i) change colors near the route display color to other colors;
(ii) color only the route display;
(iii) drop the brightness of display as a whole other than the route display; and
(iv) make a large difference between the route display portion and other display portions in hue, chroma, and brightness.

In addition to the color change depending on whether or not a given route is displayed, the background can also be displayed in black by night and in white by day by turning on and off the light switch by a similar technique.

In the embodiment, whether or not a given route is displayed is determined, and in response to the result, the pallets are exchanged to automatically change the display colors. Therefore, regardless of whether or not a given route is displayed, a discernible screen display can be provided.

Fourth embodiment:

To enter any desired starting point and destination through the input section 18, it is cumbersome to search the national map for the local map or look the places up in the place name index each time. In this case, a route guidance apparatus according to a fourth embodiment of the invention is provided with a registration function for the user to prestore desired places in a storage means and set place names instantly as needed. The registration function is controlled by a route guidance section 26 of the operation control section 20. When the place registration mode is set through the input section 18, map information around a given destination stored in route storage section 24 together with the route search result is read and displayed on the display section 28 to enable the user to register the place around the destination.

Figure 19:
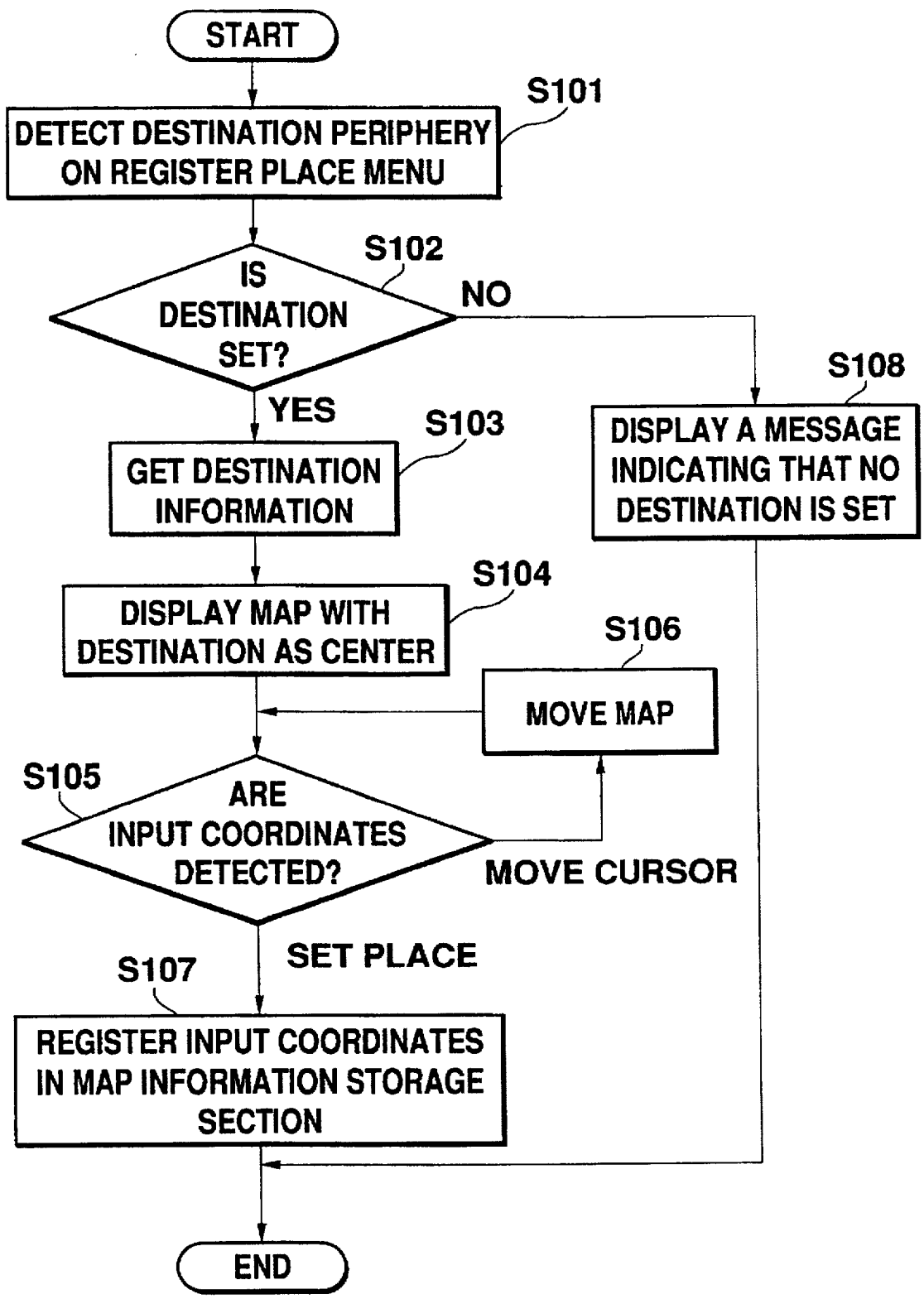
FIG. 19 is a process flowchart When a place is registered in a fourth embodiment.
Figure 20:
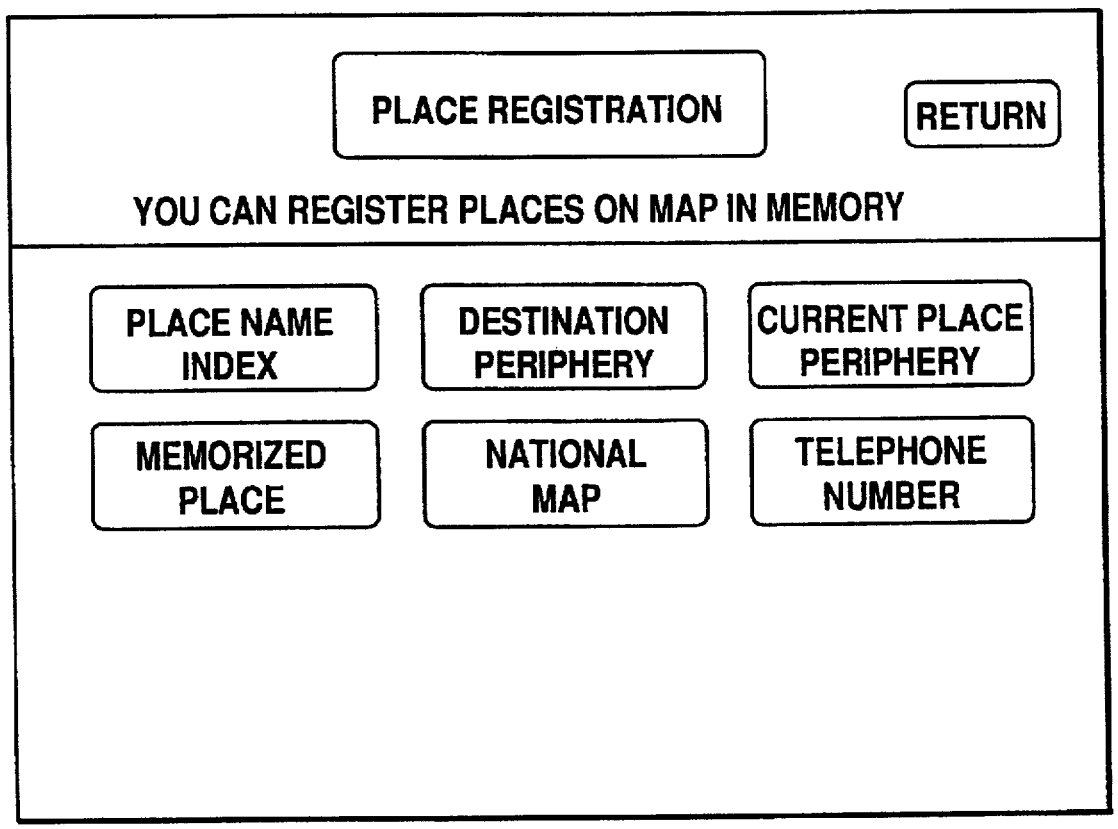
FIG. 20 shows one example of a screen display when a place is registered in the fourth embodiment.

FIG. 19 shows a process flowchart when a place is registered in the fourth embodiment. First, a menu screen appears on which NATIONAL MAP, CURRENT PLACE, PLACE NAME INDEX, ROUTE INFORMATION, MEMORY PLACE, and REGISTER PLACE are displayed. Then, if the user touches REGISTER PLACE for specification, the screen shown in FIG. 20 is displayed by the route guidance section 28 which controls the display section 28. Entries of PLACE NAME INDEX, DESTINATION PERIPHERY, CURRENT PLACE PERIPHERY, MEMORY PLACE, NATIONAL MAP, and TELEPHONE NUMBER are displayed on the screen as touch switches. The user can select any desired entry by touching it. If the user selects DESTINATION PERIPHERY on the screen, DESTINATION PERIPHERY is detected at step S101 and whether or not a destination is already set is determined at step S102. If no destination is set, a message to the effect that no destination is set is displayed on the screen to prompt the driver to set the destination. On the other hand, if a destination is already set, map information around the destination stored in the route guidance section 24 is read at step S103, and the map with the destination as the center is displayed on the display section 28 at step S104.

Figure 21:
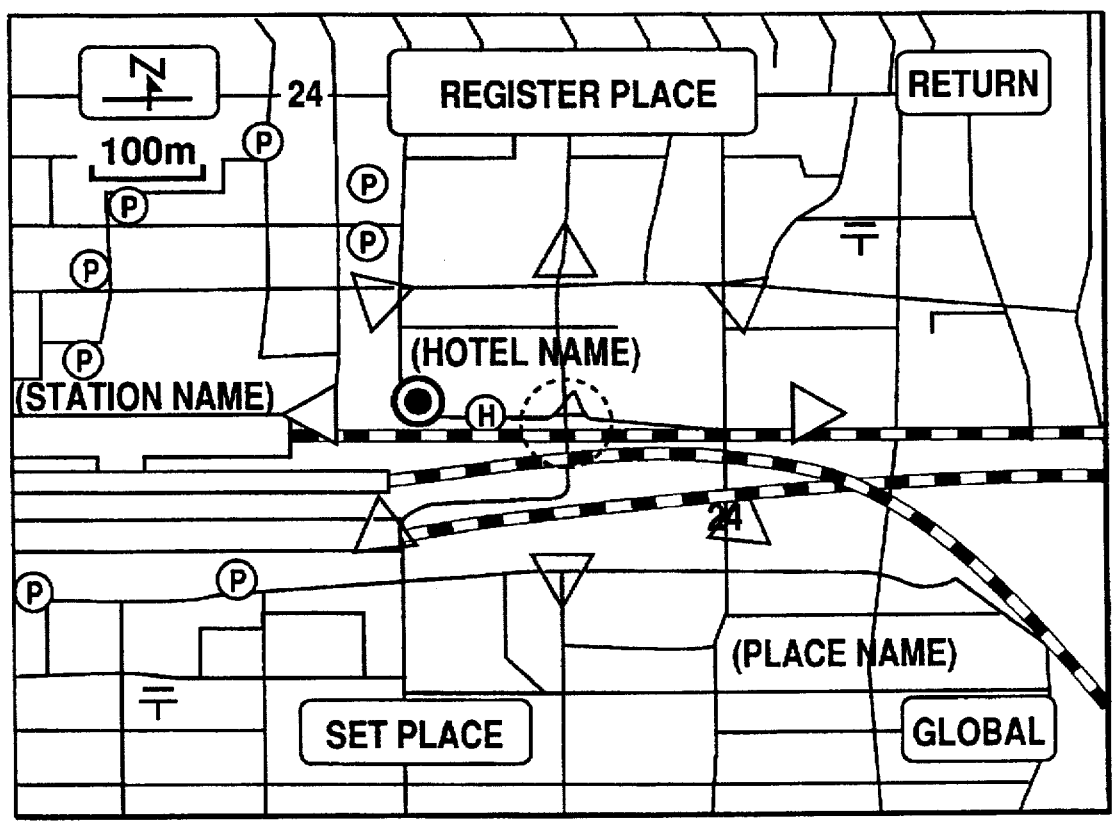
FIG. 21 shows another example of a screen display when a place is registered in the fourth embodiment.

FIG. 21 shows one example of a map with the destination as the center, wherein "KYOTO CENTURY HOTEL" is the destination, which is indicated by a double circle. The thick line in the figure indicates the route provided as a result of search. The cursor position is indicated by the + symbol. When the user touches any of the arrows pointing in eight directions displayed surrounding the cursor, the map is moved on the screen at step S108; the user can move the cursor to any desired place. When the user moves the cursor to the place to be registered and touches the SET PLACE switch in the lower left portion of the screen, the coordinates of the place are entered at step S105, and the route guidance section 26 stores the entered place coordinates in the map information storage section 10 for registration at step S107. Then, the place around the destination is registered and can be read as memory location. Thus, to set the place around the destination as a new destination, the user can also read it easily as a memory location for setting.

In the embodiment, to register the place around the destination, the map around the destination is directly displayed on the screen on which the user can set the place name to be registered without using the national map or place name index, thereby facilitating the registration operation and remarkably improving the operability of the navigation system.

Fifth embodiment:

If the driver selects an erroneous route while he or she is driving the vehicle, the current position is placed off the predetermined route. Then, an off-route condition determination section 26a in the route guidance section 26 compares the current position with the route to recognize an off-route condition. On the other hand, a display as shown in FIG. 2 appears on the display section 28. If the current position is placed off route, the current position is displayed at a point away from the route, as shown in FIG. 4.

Figure 22:
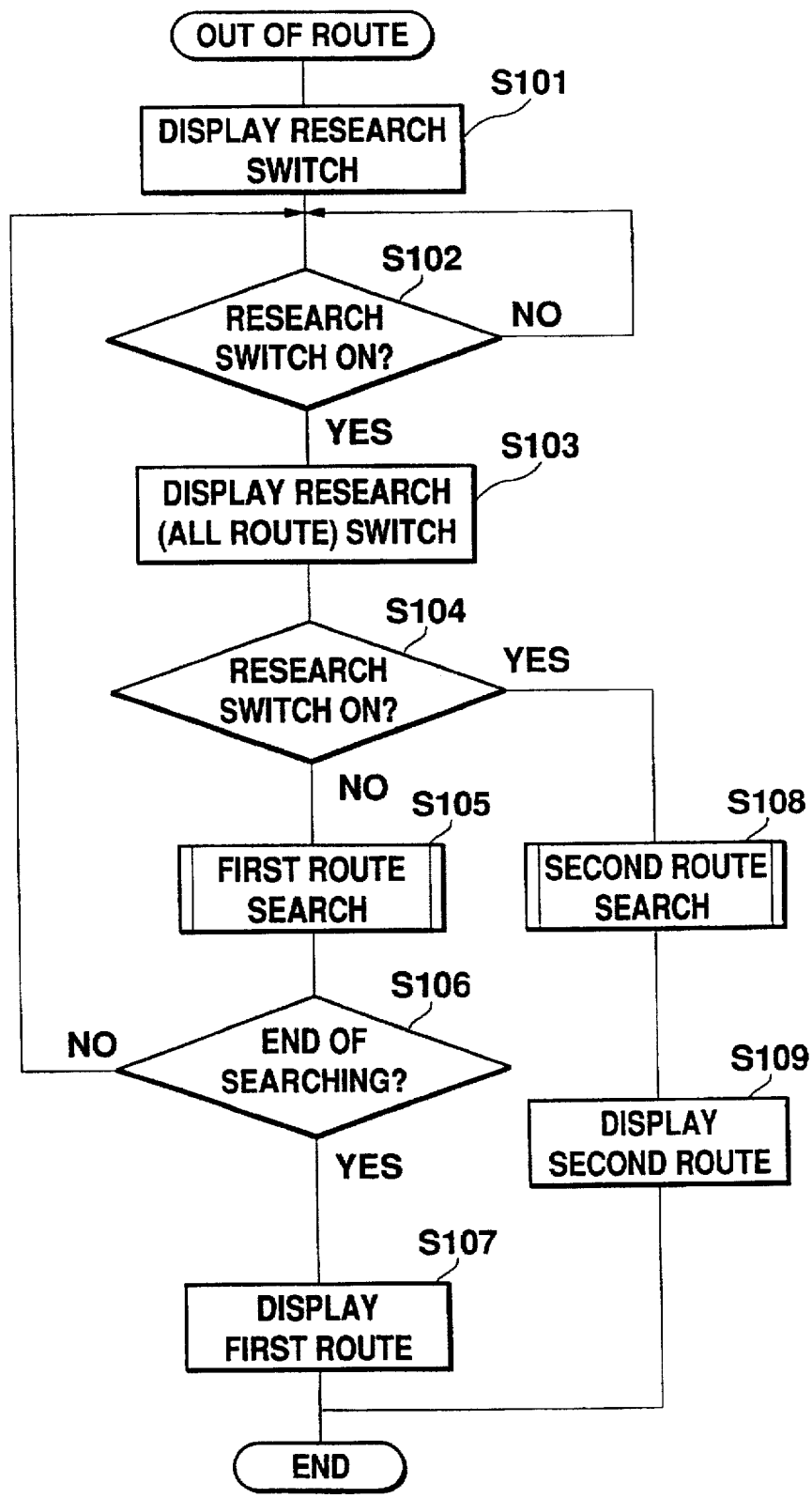
FIG. 22 is a re-searching flowchart in a fifth embodiment.
Figure 23:
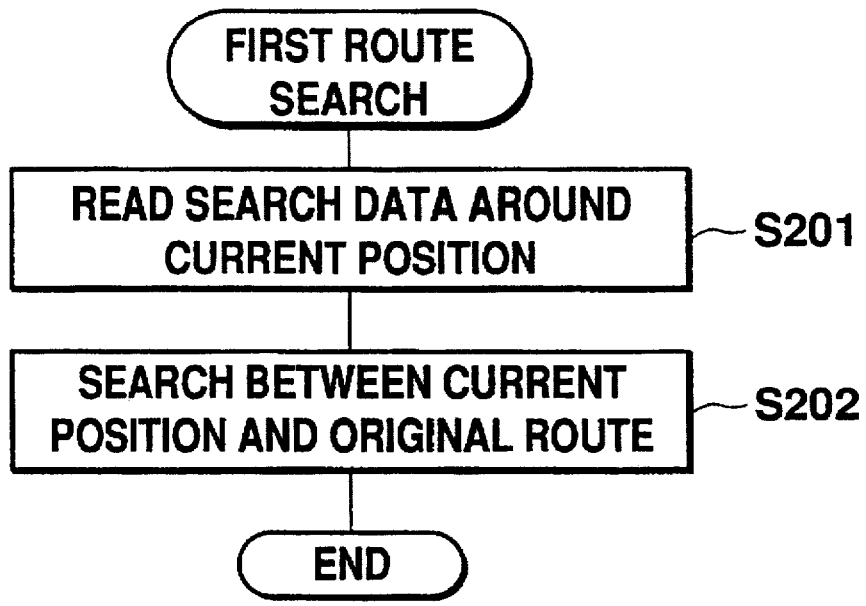
FIG. 23 is a flowchart showing a first search in the fifth embodiment.
Figure 28:
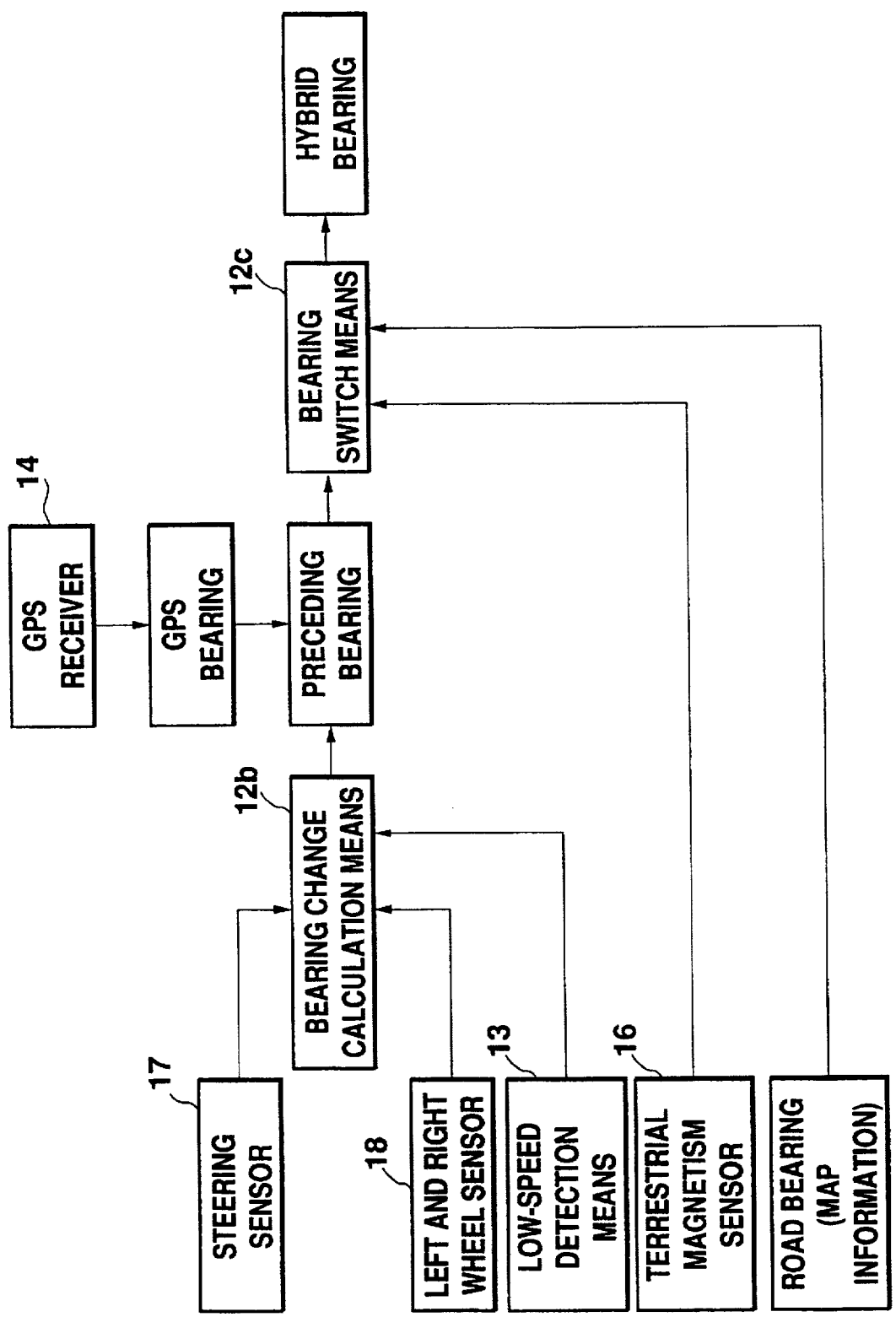
FIG. 28 is a block diagram of the configuration for a bearing determination in a sixth embodiment.

A route guidance apparatus according to a fifth embodiment of the invention is designed for the driver to select either of two search methods if the vehicle carrying the apparatus goes off route. FIG. 22 shows a process flowchart when an off-route condition is detected in the fifth embodiment. First, if an off-route condition is determined, the route guidance section 26 displays a RE-SEARCH switch on the navigation screen at step S101. As mentioned in the description of the first embodiment, the RE-SEARCH display portion on the bottom of the screen in FIG. 4 is the touch switch. By operating the touch switch, the first search is made, that is, a route from the current position to the original route is found. If the driver touches the RE-SEARCH part on the screen (S102), control proceeds to the next step (S103) at which a RE-SEARCH (ALL ROUTE) switch is displayed. The area in which "RE-SEARCH AGAIN TOUCH FOR ALL ROUTE SEARCH" is displayed on the bottom of the screen shown in FIG. 28 is the RE-SEARCH (ALL ROUTE) switch. Whether or not this touch switch is touched is determined at step S104. If it is not touched, a route from the current position to the original route is again found at step S105 as described above (first search). FIG. 23 shows a process flowchart of the first search. First, at step S201, search data around the current position is read from a search information storage section 10a in map information storage section 10. Next, at step S202, a search is made between the current position and the original route by assuming that the shortest point from the current position to the original route is a temporary destination to find a route from the current position to the original route. Whether or not the first search terminates is determined at step S106. If the search terminates, the search result (first route) is displayed on the screen.

Figure 24:
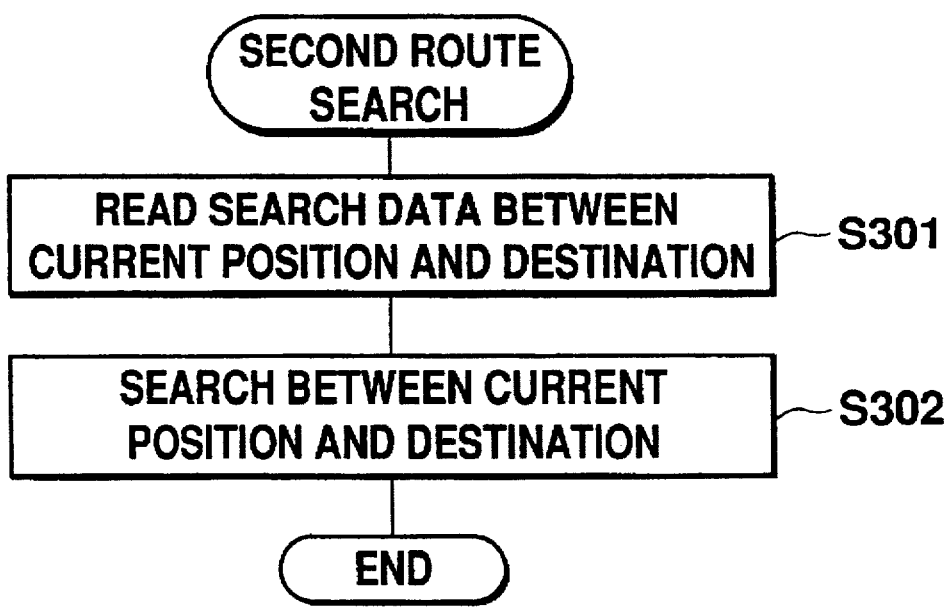
FIG. 24 is a flowchart showing a second search in the fifth embodiment.
Figure 25:
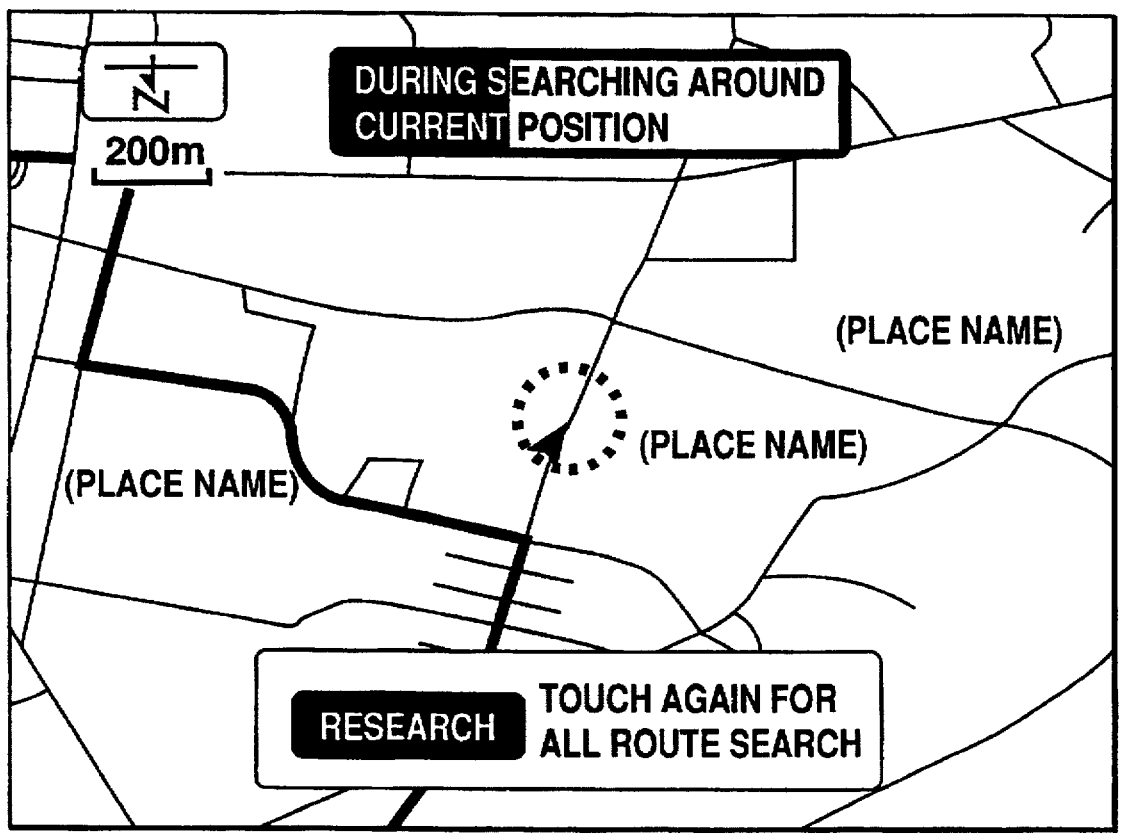
FIG. 25 shows one display screen example in the fifth embodiment.
Figure 26:
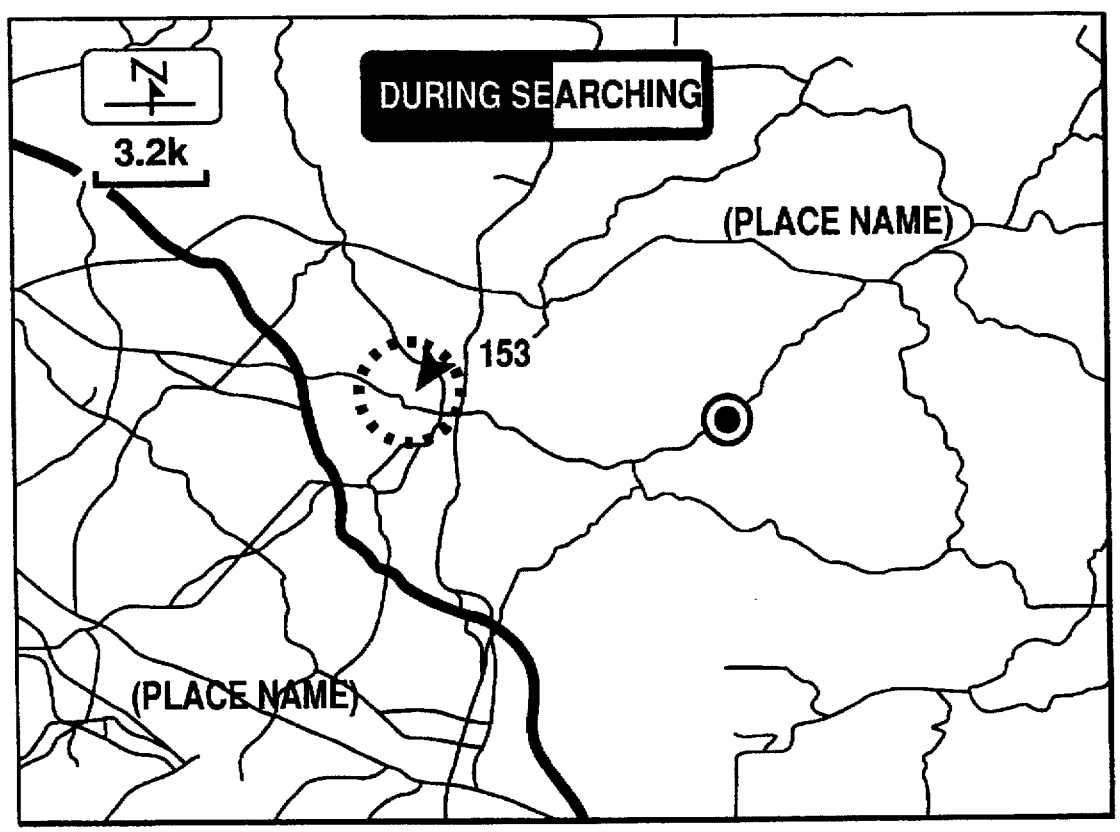
FIG. 26 shows another display screen example in the fifth embodiment.
Figure 27:
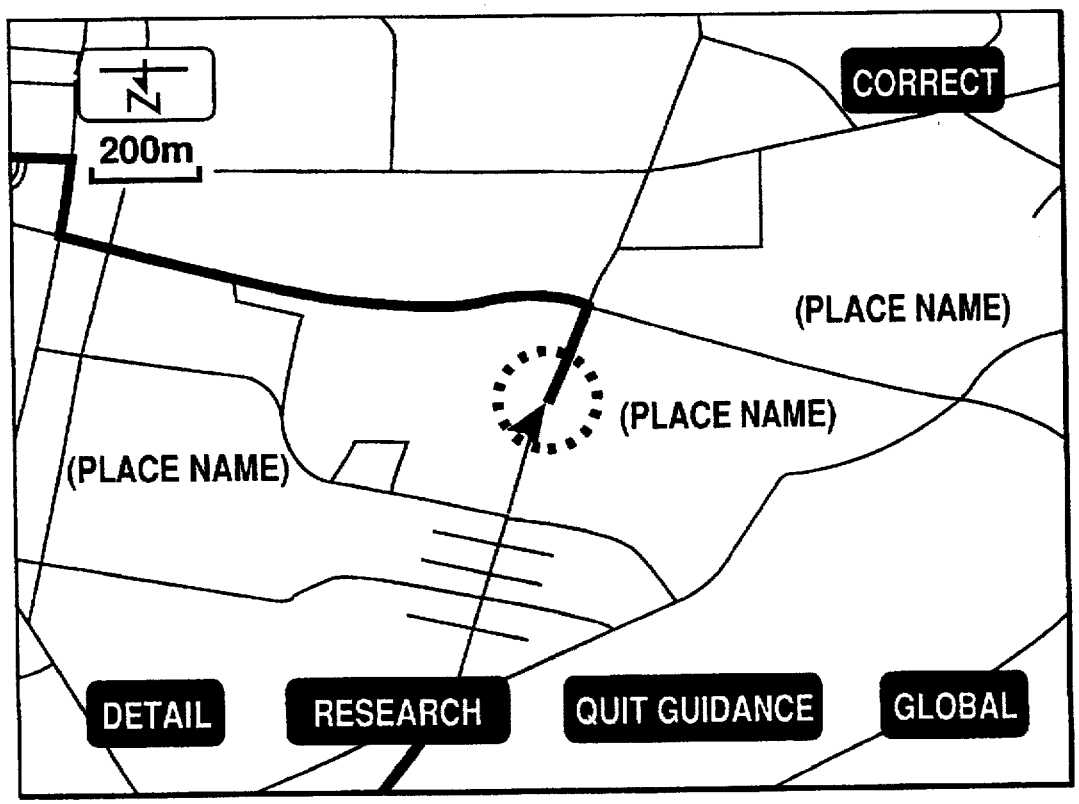
FIG. 27 shows another display screen example in the fifth embodiment.

On the other hand, if the driver again touches the RE-SEARCH switch on the screen in FIG. 25, YES is determined at step S104 and control jumps to step S108 at which re-searching is executed for a route from the current position to the original destination (second search). FIG. 24 shows a process flowchart of the second search. First, at step S301, search data between the current position and the destination is read from the search information storage section 10a in the map information storage section 10. Next, at step S302, a search is made for a new route to the destination by the same method as searching for the original route, such as the Dykstra method. During searching, the screen as shown in FIG. 26 is displayed informing the driver that searching is in progress. When the searching terminates, the route is displayed on the screen at step S109, as shown in FIG. 27 (second route).

In the embodiment, when an off-route condition is detected, the route guidance apparatus only informs the driver that the off-route condition has occurred by displaying the route and the current position and RE-SEARCH on the screen without immediately executing re-searching. The route guidance apparatus does not re-search for a new route until the driver touches the RE-SEARCH key. When the driver touches the RESEARCH key once, the first search is made, that is, a route from the current position to the original route is found. If the driver again touches the switch, a search is made for a new route from the current position to the destination. This can efficiently prevent the apparatus from executing unnecessary re-searching when the driver drives the vehicle off route on purpose. In addition, route guidance can be executed more in line with the driver's driving taste.

In the embodiment, one switch serves as both switches for instructing first search start and second search start (either function is selected depending on the number of times the touch switch is touched). However, needless to say, two separate switches may be adopted.

For researching, the route guidance apparatus according to the fifth embodiment of the invention enables the driver to select either of the two types of search for returning to the original route from the current position and for finding a new route from the current position to the destination, thereby providing a more diversified and more flexible navigation system matching driver's driving taste.

Sixth embodiment:

FIG. 28 shows a more detailed block diagram of the configuration for a bearing determination in a sixth embodiment. Both the steering angle from a steering sensor 17 and the difference between the numbers of revolutions of left and right front wheels from a left and right wheel sensor 18 are supplied to bearing change calculation means 12b in a bearing determination section 12a of a current position determination section 12. A bearing change of the vehicle carrying the apparatus is detected from a steering angle change. At low speed, a bearing change of the vehicle is detected from the difference between the numbers of revolutions of the left and right wheels in response to a detection signal from low-speed detection means 13 which is made up of a speed sensor and a comparator and outputs the low-speed detection signal when the speed falls below predetermined speed, for example, 3.5 km/h. The detected bearing change is added to the preceding bearing for estimating the current bearing. On the other hand, the GPS bearing calculated in response to an output from a GPS receiver 14 is also compared with the preceding bearing to correct the current bearing. However, the GPS bearing is not always adopted; it is adopted only in given cases.

Figure 29:
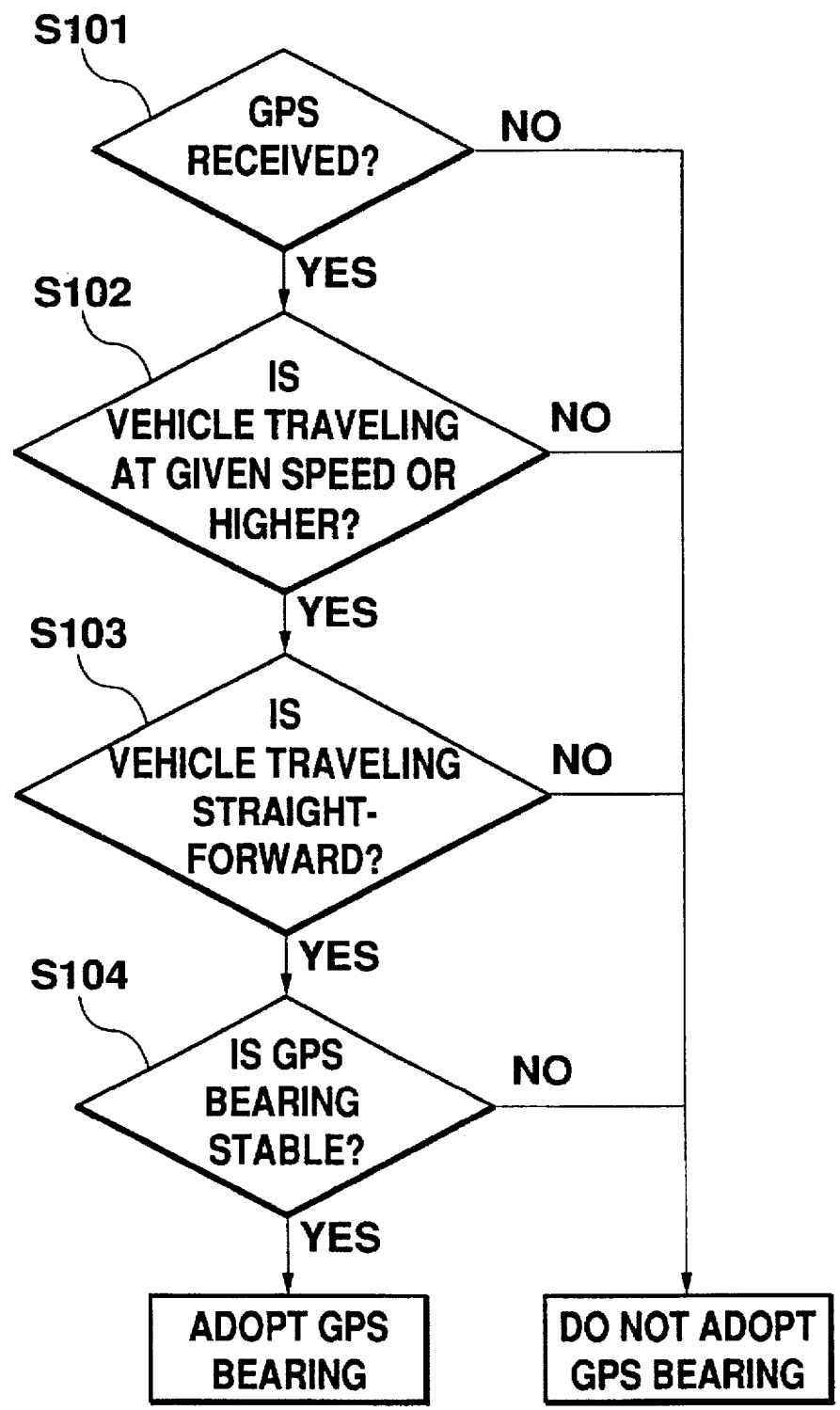
FIG. 29 is a flowchart of GPS bearing adoption in the sixth embodiment.

FIG. 29 shows a flowchart of determination as to whether or not the GPS bearing is to be adopted. First, at step S101, GPS bearing is received through the GPS receiver 14. Next, at step S102, whether or not the vehicle is traveling at a given speed or higher is determined. If the vehicle runs at the given speed or higher, then control proceeds to step S103 at which whether or not the vehicle runs straightforward is determined. If the vehicle travels straightforward at the given speed or higher, a sufficient Doppler effect from by GPS signals is expected. Whether or not the GPS bearing detected by using the Doppler effect is obtained stably is determined at step S104. If the GPS bearing is stable, it is adopted. In other cases, for example, if the vehicle travels at low speed or is turned left or right, precision sufficient for a bearing determination using the Doppler effect cannot be expected, and the GPS bearing is not adopted.

By using the preceding bearing and bearing change and the GPS bearing, a detection error of the steering sensor 17 is received for calculating the current bearing. The current bearing is supplied to bearing switch means 12c in the bearing determination section 12a. The bearing switch means 12c compares the bearing thus calculated with bearing data from a terrestrial magnetism sensor 16 to estimate the current bearing and also compares the bearing with bearing data of the nearest road obtained as a result of map matching for switching to the bearing matching the road bearing, then outputs this as the final bearing (hybrid bearing). A known technique is used for the map matching. For example, if it is determined in response to a signal from the steering sensor 17 that the vehicle has turned left or right at a crossing, the current position is drawn into the crossing on the map for correction. Road bearing data specified by such map matching may be read from the map information storage section 10 such as CD-ROM into the bearing switch means 12c.

In the embodiment, in addition to the conventional bearing sensor, the GPS bearing with GPS signals from artificial satellites can be used for more accurate bearing calculation and further the bearing is corrected so as to match the road bearing obtained by map matching to determine the final bearing, thereby enabling extremely precise bearing detection for improvement in reliability of the navigation system.

Seventh embodiment:

For the route guidance apparatus described above, a determination of the current position of the vehicle carrying the apparatus is an indispensable function. However, an error is contained in the position determination by the GPS, bearing sensor, steering sensor, and distance sensor as described above. If two roads such as an auto road and a general road are located in parallel, higher precision is required for the current position determination means described above to determine which road the vehicle is traveling. Particularly, discrimination between an elevated highway and a road running underneath requires a technology which is difficult to accomplish.

Figure 30:
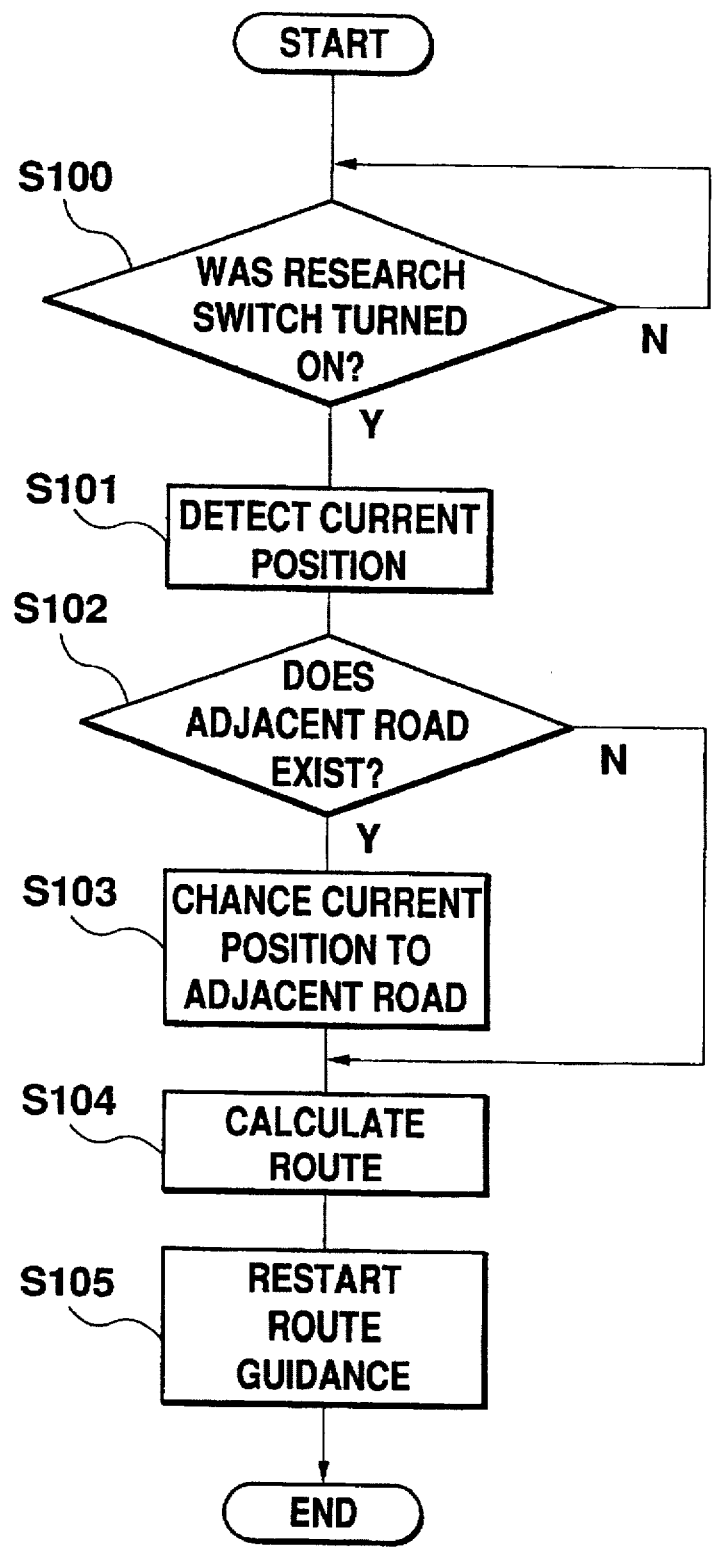
FIG. 30 is a flowchart showing a control sequence when a RE-SEARCH switch is touched while a route guidance apparatus according to a seventh embodiment of the invention is executing route guidance.

The discrimination method between roads running in parallel by a route guidance apparatus according to a seventh embodiment of the invention is described in conjunction with FIGS. 1 and 30.

The route guidance apparatus according to the seventh embodiment is designed to execute route guidance in a different manner depending on which of an auto road or a general road the vehicle carrying the apparatus travels on. For example, if the vehicle is traveling on a freeway, the route guidance apparatus executes voice guidance saying "descend the XX ramp on the highway" for informing the driver of the next ramp to go down. If the vehicle travles on a general road beneath the highway at this time, the driver should give a position change command by touching a RE-SEARCH touch switch displayed on the screen of display section 28. If the current road on which the vehicle is traveling differs from the road to which route guidance applies, the driver may touch the RE-SEARCH switch for causing the route calculation section 22 to read information as to whether or not an adjacent road exists from the map information storage section 10. If an adjacent road exists, the route calculation section 22 changes the current position of the vehicle. Then, the route calculation section 22 calculates a new route to the already entered destination from the current position. The subsequent route guidance sequence is as described above. The new calculated route is stored in the route storage section 24, and in response to the stored information and the determination result of the current position determination section 12, the route guidance section 26 executes route guidance using a voice and by displaying a map on the screen.

As described above, when the position of the vehicle is changed to the adjacent road, the route guidance apparatus according to the seventh embodiment is designed to again search for a new route. This researching mode is generally provided to calculate a new route if the driver selects an erroneous road and places the vehicle off a predetermined route. The re-searching mode is provided with an additional step of determining whether or not an adjacent road exists; if an adjacent road exists, the current position is changed to the road for re-searching for a new route.

The control flow in the embodiment is described in conjunction with FIG. 30. Whether or not the RE-SEARCH switch is touched during route guidance is determined at step S100. Only when the switch is touched, does control proceed to step S101 at which the current position is detected. The current position is a position immediately before the RE-SEARCH switch is touched, and contains data of the road on which the vehicle is traveling. The data for the road on which the vehicle is assumed to be traveling at any time may differ from the actual road on which the vehicle is traveling. Whether or not a road is adjacent to the road at the detected current position is determined at step S102. If the adjacent road exists, the current position is changed to the adjacent road at step S103, thereby matching the road on the data with the actual road on which the vehicle is traveling. Based on the current position data, a new route is calculated at step S104. In response to the new calculated route, route guidance is restarted at step S105.

On the other hand, if no adjacent road exists, control jumps to step S104 at which a route is calculated from the current position. This case applies to a case where the vehicle goes off route for some reason and a new route from the position off route to the destination is calculated.

Although a change of the current position to an adjacent road during route guidance is described in the embodiment, display can also be shifted to an adjacent road when no route guidance is executed, that is, when a map around the vehicle and the current position of the vehicle are displayed on the display section. For example, the apparatus is adopted to change the current position if the user touches the RE-SEARCH switch when no route guidance is executed. First, when the RE-SEARCH switch is touched, whether or not an adjacent road exists is determined. If the adjacent road exists, the driver is aurally informed of the current road on which the vehicle is traveling. If no adjacent road exists, control is terminated. If the current road on which the driver is driving the vehicle differs from the road of which the driver is informed aurally, the driver can again touch the RE-SEARCH switch for changing the current position to the adjacent road.

In the embodiment, the user is aurally informed of the current road on which the vehicle is traveling, but the current road may be displayed on the screen of the display section.

What is claimed is:

1. A vehicle bearing detection system installed on a vehicle for detecting a bearing of the vehicle, comprising:

a plurality of bearing detectors for individually detecting the bearing of the vehicle; and a switching apparatus for carrying out switching operations to selectively output detection signals from the plurality of bearing detectors as the vehicle bearing responsive to a determination that the vehicle is traveling along a straight line.

2. The vehicle bearing detection system as defined in claim 1, wherein the switching apparatus also switches the output of the detection signals from the plurality of bearing detectors responsive to a speed of the vehicle exceeding a predetermined value.

3. The vehicle bearing detection system as defined in claim 2, wherein one of the plurality of bearing detectors detects a Doppler shift in received signals from a GPS (Global Positioning System) receiver for receiving signals from an artificial satellite to determine the vehicle bearing, and wherein the switching apparatus switches the output of the detection signals from the plurality of bearing detectors responsive to a determination that the bearing of the vehicle determined by a Doppler shift of the received signals is stable.

4. The vehicle bearing detection system as defined in claim 1, wherein the current position detector includes a GPS receiver for receiving signals from artificial satellites.

5. The vehicle bearing detection system as defined in claim 4, wherein another one of the bearing detectors detects a Doppler shift in signals received from the GPS receiver to detect the vehicle bearing.

6. The vehicle bearing detection system as defined in claim 5, wherein one of the plurality of bearing detectors includes:

a current position detector; and a map information memory for storing map information including information concerning road bearing, the bearing detector detecting the vehicle bearing from the road bearing corresponding to the current position of the vehicle.

7. A vehicle bearing detection system for detecting bearing of a vehicle comprising:

A Global Positioning System receiver for receiving position information from artificial satellites;

A Global Positioning System bearing detector for detecting a bearing of the vehicle from a Doppler shift contained in output signals from the Global Positioning System receiver;

a map information memory for storing map information including road bearing; and a map bearing detector for detecting the road bearing at a current position of the vehicle which is determined based on the received signals from the Global Positioning System receiver, to detect the bearing of the vehicle;

a switching means for carrying out switching operations to selectively output detection signals from the two bearing detectors as the vehicle bearing responsive to a determination that the vehicle is traveling along a straight line; wherein the bearing of the vehicle being finally detected on a basis of both an output from the Global Positioning System bearing detector and an output from the map bearing detector.

8. The vehicle bearing detection system as defined in claim 7, further comprising:

a terrestrial magnetism sensor for detecting terrestrial magnetism to determine the bearing of the vehicle;

the bearing of the vehicle being determined by further considering an output from the terrestrial magnetism sensor.

9. The vehicle bearing detection system as defined in claim 7, further comprising:

a revolution number difference detector for detecting a difference between a number of revolutions of a right wheel and a number of revolutions of a left wheel;

the bearing of the vehicle being detected on a basis of the detected difference.

10. The vehicle bearing detection system as defined in claim 7, further comprising:

a steering sensor for detecting a steering angle;

the bearing of the vehicle being detected on a basis of the detected steering angle.

11. The vehicle bearing detection system as defined in claim 7, said switching means comprising a switching apparatus that adopts an output of the Global Positioning System receiver as an actual bearing of the vehicle and corrects an output of at least one of the other bearing detectors using the actual bearing of the vehicle determined by the Global Positioning System receiver responsive to a determination that the bearing of the vehicle determined by the Doppler shift of the received signals is stable.

12. The vehicle bearing detection system as defined in claim 11, wherein the switching apparatus switches the output of the detection signals from the plurality of bearing detectors responsive to a speed of the vehicle exceeding a predetermined value.

13. A vehicle bearing detection system installed on a vehicle for detecting a bearing of the vehicle, comprising:

a plurality of bearing detectors for individually detecting the bearing of the vehicle;

one of the plurality of bearing detectors detecting a Doppler shift in received signals from a Global Positioning System receiver for receiving a signal from an artificial satellite to determine the bearing of the vehicle; and a switching apparatus that adopts an output of the Global Positioning System receiver as an actual bearing of the vehicle and corrects an output of at least one of the other bearing detectors using the actual bearing of the vehicle determined by the Global Positioning System receiver responsive to a determination that the vehicle is traveling along a straight line.

14. The vehicle bearing detection system as defined in claim 13, wherein the switching apparatus further switches the output of the detection signals from the plurality of bearing detectors responsive to a speed of the vehicle exceeding a predetermined value.

* * * * *